(12) United States Patent
Fujita et al.

(10) Patent No.: US 8,773,870 B2
(45) Date of Patent: Jul. 8, 2014

(54) POWER CONVERTER AND METHOD FOR CONTROLLING SAME

(75) Inventors: Takayuki Fujita, Shiga (JP); Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 184 days.

(21) Appl. No.: 13/392,132

(22) PCT Filed: May 7, 2010

(86) PCT No.: PCT/JP2010/003144
§ 371 (c)(1),
(2), (4) Date: Feb. 24, 2012

(87) PCT Pub. No.: WO2011/024351
PCT Pub. Date: Mar. 3, 2011

(65) Prior Publication Data
US 2012/0163045 A1     Jun. 28, 2012

(30) Foreign Application Priority Data

Aug. 26, 2009 (JP) ................................ 2009-195097

(51) Int. Cl.
*H02M 3/335* (2006.01)
*H02M 7/68* (2006.01)

(52) U.S. Cl.
USPC .................. 363/17; 363/37; 363/98; 363/132

(58) Field of Classification Search
USPC ........................................ 363/17, 37, 98, 132
See application file for complete search history.

(56) References Cited

U.S. PATENT DOCUMENTS

| | | | |
|---|---|---|---|
| 6,850,424 B2 * | 2/2005 | Baudelot et al. | 363/37 |
| 6,995,992 B2 * | 2/2006 | Wei et al. | 363/34 |
| 7,068,526 B2 * | 6/2006 | Yamanaka et al. | 363/98 |
| 7,135,835 B2 * | 11/2006 | Yamada et al. | 318/800 |

(Continued)

FOREIGN PATENT DOCUMENTS

| | | |
|---|---|---|
| JP | 2002-209390 A | 7/2002 |
| JP | 2003-092888 A | 3/2003 |

(Continued)

OTHER PUBLICATIONS

Manabu Takei et al., Fuji Electric Journal vol. 75, No. 8, 2002, pp. 445-448.

*Primary Examiner* — Bao Q Vu
(74) *Attorney, Agent, or Firm* — Birch, Stewart, Kolasch & Birch, LLP

(57) ABSTRACT

A converter section (2) includes three pairs of switching elements (Srp, . . . , Stn), each pair having two switching elements connected in series between two direct current links (L1, L2), and phases of an input three-phase alternating current are connected to nodes between the series-connected switching elements one by one. Each of the switching elements (Srp, . . . , Stn) is made of a transistor having a bipolar structure. The control unit (5) controls the switching elements (Srp, . . . , Stn) such that line voltages between a reference phase, which is one of the phases of the input three-phase alternating current, and each of the other phases are output to the two direct current links (L1, L2) on a time division basis. The control unit (5) applies a predetermined gate voltage to one or more of the switching elements (Srp, . . . , Stn) to which a reverse bias is applied.

12 Claims, 19 Drawing Sheets

(56) References Cited

U.S. PATENT DOCUMENTS

| | | | |
|---|---|---|---|
| 7,518,891 B2 * | 4/2009 | Wei et al. | 363/41 |
| 7,944,717 B2 * | 5/2011 | Sakakibara | 363/37 |
| 8,310,848 B2 * | 11/2012 | Sakakibara | 363/37 |
| 8,450,961 B2 * | 5/2013 | Sakakibara | 318/504 |
| 2001/0015904 A1 | 8/2001 | Kimura et al. | |
| 2003/0053323 A1 | 3/2003 | Kimura et al. | |
| 2009/0175059 A1 | 7/2009 | Sakakibara | |
| 2010/0213769 A1 | 8/2010 | Sakakibara | |
| 2010/0246217 A1 * | 9/2010 | Sakakibara | 363/37 |

FOREIGN PATENT DOCUMENTS

| | | |
|---|---|---|
| JP | 2005-210831 A | 8/2005 |
| JP | 2006-166582 A | 6/2006 |
| JP | 2007-028860 A | 2/2007 |
| JP | 4135026 B2 | 6/2008 |
| JP | 2009-106111 A | 5/2009 |
| WO | WO 2007/123118 A1 | 11/2007 |

* cited by examiner

| MODE | 0 | |
|---|---|---|
| Emax | Vrt | Vst |
| Emid | Vst | Vrt |
| MAXIMUM PHASE | Srp | Ssp |
| INTERMEDIATE PHASE | Ssp | Srp |
| REFERENCE PHASE | Stn | |

| MODE | 0 | |
|---|---|---|
| Emax | Vrt | Vst |
| Emid | Vst | Vrt |
| MAXIMUM PHASE | Srp | Ssp |
| INTERMEDIATE PHASE | Ssp | Srp |
| REFERENCE PHASE | Stn | |

FIG.16
(A) GATE PATTERN A
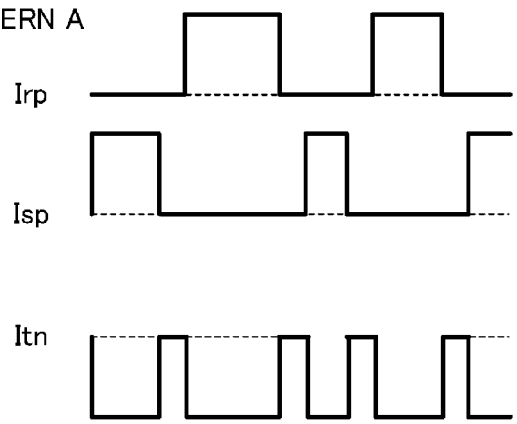
(B) GATE PATTERN B
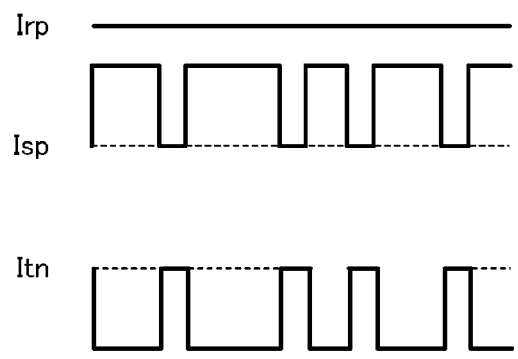

POWER CONVERTER AND METHOD FOR CONTROLLING SAME

TECHNICAL FIELD

The present invention relates to power converters for converting alternating-current power to direct-current power or alternating-current power, and a method for controlling the power converters.

BACKGROUND ART

In many air conditioners, power converters which convert commercial alternating-current power to certain alternating-current power are used to supply power to a motor of a compressor. These power converters include, for example, a direct power converter for alternating current which directly converts alternating-current voltage to a desired alternating-current output, and is typically represented by a so-called matrix converter. This matrix converter does not need a large capacitor which smoothes a voltage ripple caused due to commercial frequencies, nor a reactor, and therefore it is expected that the size of the power converter can be reduced. The matrix converters have been gaining attention as next-generation power converters (see, for example, Patent Document 1).

Various attempts to improve efficiencies of such power converters have also been made. For example, there is a case in which a reverse blocking diode is connected in series to a switching element used in a power converter to ensure resistance to a reverse bias. However, the provision of such a reverse blocking diode increases conduction loss, and inhibits improvement in efficiency. To solve this problem, a reverse blocking insulated gate bipolar transistor (IGBT) which does not need a reverse blocking diode and is capable of reducing a reduction in an ON voltage of a switching element is suggested as a switching element (see, for example, Non-Patent Document 1).

CITATION LIST

Patent Document

Patent Document 1: Japanese Patent No. 4135026

Non-Patent Document

Non-Patent Document 1: Takei Manabu et al., *Fuji Electric Journal*, Vol. 75, No. 8, 2002

SUMMARY OF THE INVENTION

Technical Problem

However, transistors such as a reverse blocking IGBT having a bipolar structure have a characteristic in which if a reverse bias voltage is applied while in the off state, the larger the applied voltage, the more leakage current flows. This characteristic becomes more significant as the temperature of the switching element increases. That is, even if the adoption of the reverse blocking IGBT reduces the conduction loss, it does not necessarily mean that the efficiency of the power converter is improved. This can hold true not only for the direct power converter for alternating current, but also for a converter circuit which receives alternating-current power and outputs direct-current power.

The present invention was made in view of the above problems, and it is an objective of the invention to reduce a leakage current of a switching element in a power converter using a transistor having a bipolar structure.

Solution to the Problem

To solve the above problems, the first aspect of the present invention is a power converter, including: a converter section (2) which includes three pairs of switching elements (Srp, . . . , Stn), each pair having two switching elements connected in series between two output lines (L1, L2), and in which phases of an input three-phase alternating current are connected to nodes between the series-connected switching elements one by one; and a control unit (5) which controls on/off operations of the switching elements (Srp, . . . , Stn) such that line voltages between a reference phase, which is one of the phases of the input three-phase alternating current, and each of the other phases are output to the two output lines (L1, L2) on a time division basis, wherein each of the switching elements (Srp, . . . , Stn) is made of a transistor having a bipolar structure, and the control unit (5) applies a predetermined gate voltage to one or more of the switching elements (Srp, . . . , Stn) to which a reverse bias is applied.

In this structure, the input three-phase alternating current is converted to a direct current voltage by the switching of the switching elements (Srp, . . . , Stn). In this case, there are some switching elements (Srp, . . . , Stn) to which a reverse bias is applied. Each of the switching elements (Srp, . . . , Stn) of the converter section (2) is made of a transistor having a bipolar structure, and in general, a switching element to which a reverse bias is applied generates a leakage current. However, according to this power converter, the leakage current is reduced by utilizing a characteristic of the transistor having a bipolar structure in which a leakage current is reduced if a gate voltage is applied while a reverse bias is applied. Specifically, the control unit (5) applies a gate voltage to the switching element to which the reverse bias is applied. If each of the switching elements (Srp, . . . , Stn) is made of a reverse blocking IGBT, or made to include a reverse blocking diode, no short circuit between the two output lines (L1, L2) is caused by the application of the gate voltage to the switching element (Srp, . . . , Stn) to which the reverse bias is applied.

The second aspect of the present invention is that in the power converter of the first aspect of the present invention, a phase whose voltage has a largest absolute value is selected as the reference phase in each of a sector in which two phase voltages of the input three-phase alternating current are positive and one phase voltage is negative, and a sector in which two phase voltages are negative and one phase voltage is positive; and provided that one of the phases other than the reference phase whose voltage has an absolute value larger than a voltage of the other phase is a maximum phase, the control unit (5) controls, at a predetermined duty cycle (drt, dst), the on/off operation of one of the switching elements (Srp, . . . , Stn) corresponding to at least the maximum phase to which a forward bias is applied.

In this structure, two-level direct current voltage in which an alternating-current voltage component is superimposed on a direct current voltage component is output.

The third aspect of the present invention is that in the power converter of the second aspect of the present invention, the control unit (5) controls the on/off operations of only the switching elements (Srp, . . . , Stn) corresponding to the maximum phase.

In this structure, switching of only the switching elements corresponding to one phase is controlled (that is, only one phase is modulated) to output the two-level direct current voltage in which an alternating-current voltage component is superimposed on a direct current voltage component, and a predetermined gate voltage is applied to the switching elements whose switching is not controlled.

The fourth aspect of the present invention is that in the power converter of the second aspect of the present invention, provided that the phase other than the reference phase and the maximum phase is an intermediate phase, the on/off operations of the switching element (Srp, . . . , Stn) to which the forward bias is applied, and one of the switching elements (Srp, . . . , Stn) corresponding to the intermediate phase from which a current flows, are complementarily controlled at a predetermined duty cycle (drt, dst) during part of a period of each sector, and the on/off operation of only the switching element (Srp, . . . , Stn) to which the forward bias is applied is controlled at a predetermined duty cycle (drt, dst) during the rest of the period of the sector.

In this structure, the power converter can be operated by two switching patterns, that is, a switching pattern in which only one phase is modulated and a switching pattern in which two phases are modulated.

The fifth aspect of the present invention is that in the power converter of the fourth aspect of the present invention, a filter capacitor (C11, C12, C13) is provided for each of the phases of the input three-phase alternating current, and the part of the period includes a period in which a voltage of the filter capacitor (C11, C12, C13) corresponding to the intermediate phase is larger than a voltage of the filter capacitor (C11, C12, C13) corresponding to the maximum phase.

In this structure, carrier ripples are superimposed in the filter capacitor (C11, C12, C13). Thus, the relationship of the magnitude of the voltages of the filter capacitors (C11, C12, C13) may sometimes be reversed from the proper relationship, near the phase angle at which the maximum phase and the intermediate phase change. In the fifth aspect of the present invention, two-phase modulation is performed in the period when the relationship of the magnitude of the voltages is reversed.

The sixth aspect of the present invention is that in the power converter of the fourth or fifth aspect of the present invention, the part of the period is a period corresponding to a 30 degree phase angle of the input three-phase alternating current.

In this structure, one-phase modulation period and two-phase modulation period are switched at each integer submultiple period of the sector.

The seventh aspect of the present invention is that in the power converter of the second aspect of the present invention, provided that the phase other than the reference phase and the maximum phase is an intermediate phase, the control unit (5) complementarily controls, at a predetermined duty cycle (drt, dst), the on/off operations of the switching element (Srp, . . . , Stn) to which the forward bias is applied, and one of the switching elements (Srp, . . . , Stn) corresponding to the intermediate phase from which a current flows.

In this structure, two phases are modulated, and a predetermined gate voltage is applied to one of the switching elements corresponding to the remaining phase to which a reverse bias is applied.

The eighth aspect of the present invention is that in the power converter of any one of the first to seventh aspects of the present invention, the control unit (5) includes' a trapezoidal voltage instruction generator (11) which obtains an inclination region of a voltage instruction signal (Vr*, Vs*, Vt*) having a trapezoidal waveform and corresponding to each of the phases of the input three-phase alternating current, based on a power source synchronization signal (Vr) synchronized to the input three-phase alternating current, and the control unit (5) generates gate signals for the respective switching elements (Srp, . . . , Stn) using the voltage instruction signal (Vr*, Vs*, Vt*) of any one of the phases.

In this structure, six gate voltages are generated not by using the voltage instruction signals (Vr*, Vs*, Vt*) of the respective phases, but by using the voltage instruction signal (Vr*, Vs*, Vt*) of any one of the phases. Thus, it is possible to simplify the configuration of the control unit (30).

The ninth aspect of the present invention is that the power converter of any one of the first to eighth aspects of the present invention includes an inverter section (3) which converts power output to the output line (L1, L2) to a predetermined single-phase alternating current or a polyphase alternating current.

In this structure, the power converter serves as a direct power converter for alternating-current which directly converts an input three-phase alternating current to a desired alternating-current power.

The tenth aspect of the present invention is a method for controlling a power converter having a converter section (2) which includes three pairs of switching elements (Srp, . . . , Stn), each pair having two switching elements connected in series between two output lines (L1, L2), and in which phases of an input three-phase alternating current are connected to nodes between the series-connected switching elements one by one, the method including: selecting one of the phases of the input three-phase alternating current as a reference phase; controlling on/off operations of the switching elements (Srp, . . . , Stn) such that line voltages between the reference phase and each of the other phases are output to the two output lines (L1, L2) on a time division basis; determining one or more of the switching elements (Srp, . . . , Stn) to which a reverse bias is applied in the on/off control; and applying, in the on/off control, a predetermined gate voltage to the one or more of the switching elements (Srp, . . . , Stn) determined in the determining of the switching element (Srp, . . . , Stn) to which a reverse bias is applied.

Advantages of the Invention

According to the first aspect of the present invention, a gate voltage is applied to a switching element to which a reverse bias is applied. Therefore, even if a transistor having a bipolar structure is used as each of the switching elements (Srp, . . . , Stn), it is possible to reduce a leakage current of the switching element when the reverse bias is applied. Further, if a reverse blocking IGBT is used, a reverse blocking diode which is conventionally needed is not necessary, and it is possible to reduce the conduction loss.

According to the second aspect of the present invention, a two-level direct current voltage can be obtained. Therefore, desired alternating-current power can be generated easily by using the direct current voltages.

According to the third aspect of the present invention, a leakage current can be reduced in the most effective manner by controlling only one switching element. Since only one switching element is switched, it is easy to control switching.

According to the fourth aspect of the present invention, for example, the leakage current can be reduced during a period of one-phase modulation, and in the case, for example, where the relationship of the magnitude of the phase voltages is reversed during two-phase modulation, distortions of the input three-phase alternating current can be reduced.

According to the fifth aspect of the present invention, it is possible to reduce distortions of the input three-phase alternating current near the phase angle at which the maximum phase and the intermediate phase change.

According to the sixth aspect of the present invention, the modulation methods are switched at each integer submultiple period of the sector. Thus, the switching can be controlled easily.

According to the seventh aspect of the present invention, distortions of the input three-phase alternating current can be reduced more reliably, and the leakage current can also be reduced.

According to the eighth aspect of the present invention, the configuration of the control unit (30) can be simplified, which leads to a simplification and a reduction in size of the power converter.

According to the ninth aspect of the present invention, the advantages according to the first to eighth aspects of the present invention can be obtained in a so-called direct power converter for alternating current.

According to the tenth aspect of the present invention, a gate voltage is applied to the switching element to which a reverse bias is applied. Thus, even if each of the switching elements (Srp, . . . , Stn) is made of a transistor having a bipolar structure, it is possible to reduce the leakage current of the switching element when the reverse bias is applied. Therefore, it is possible to reduce loss of the converter section (2) by utilizing a characteristic of the transistor having a bipolar structure that the conduction loss can be reduced.

BRIEF DESCRIPTION OF THE DRAWINGS

FIG. 16 schematically shows the waveforms of the phase currents when the switching is performed by the gate patterns A and B in the reverse period of Mode 0 (i.e., 30°-60°).

DESCRIPTION OF EMBODIMENTS

Embodiments of the present invention will be described below with reference to the drawings. The following embodiments are merely preferred examples in nature, and are not intended to limit the scope, applications, and use of the invention.

First Embodiment of the Invention

General Structure

Figure 1:
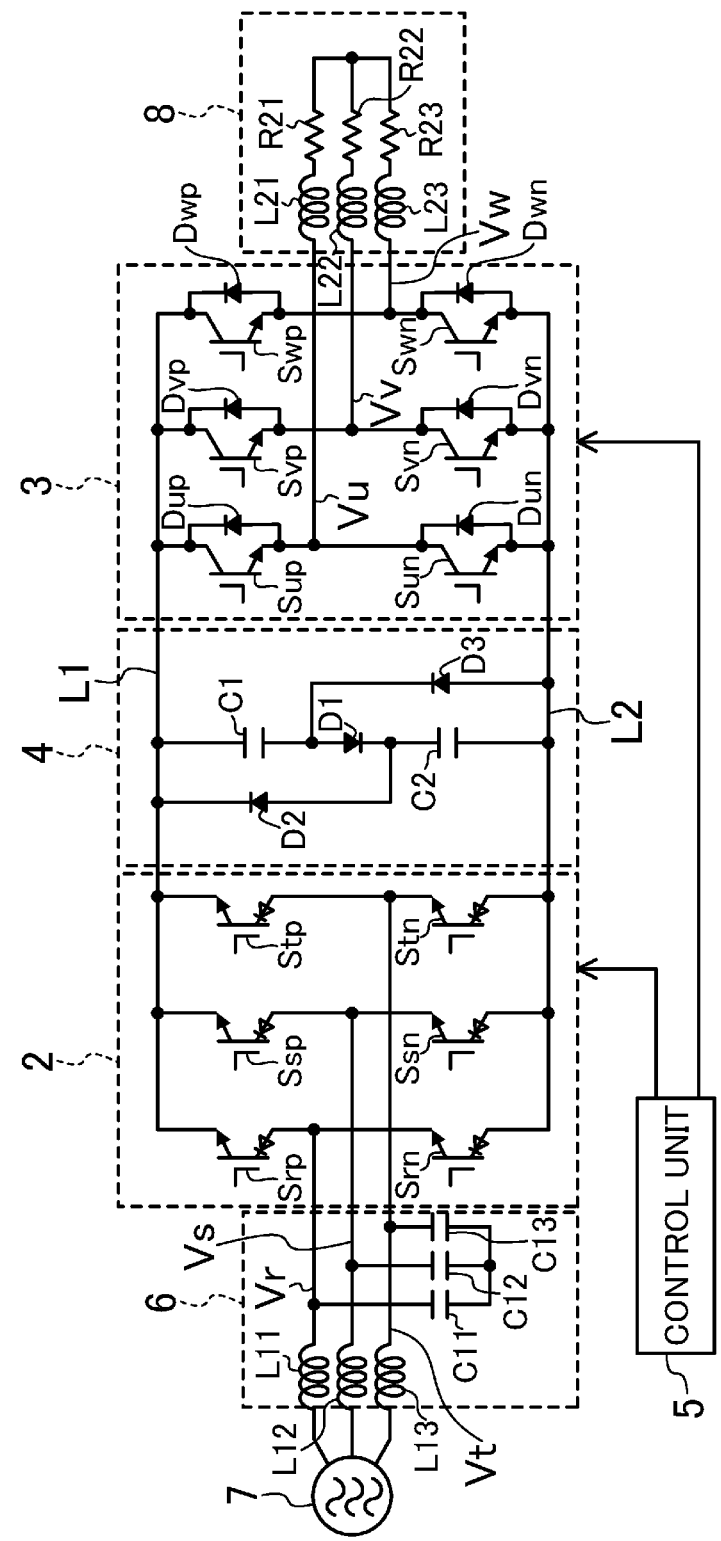
FIG. 1 shows a block diagram which illustrates a configuration of a matrix converter according to the first embodiment of the present invention.

In the first embodiment, a matrix converter will be described as an example power converter of the present invention. FIG. 1 shows a block diagram which illustrates a configuration of a matrix converter (1) according to the first embodiment of the present invention. The matrix converter (1) includes a converter section (2), an inverter section (3), a clamp circuit (4), a control unit (5), and an LC filter circuit (6). A three-phase alternating current power supply (7) and a motor (8) are connected to the matrix converter (1). Phase voltages (Vr, Vs, Vt) of the three-phase alternating current output from the three-phase alternating current power supply (7) (hereinafter referred to as an "input three-phase alternating current") are converted, by the converter section (2), to a direct current voltage in which an alternating-current voltage component is superimposed on a direct current voltage component, and the direct current voltage is converted to a three-phase alternating current (hereinafter referred to as an "output three-phase alternating current") by the inverter section (3) and is supplied to the motor (8). The motor (8) is, for example, for driving a compressor provided in a refrigerant circuit of an air conditioner. In FIG. 1, the motor (8) is shown as a load in which three coils (L21, L22, L23) and three resistors (R21, R22, R23) are in a three-phase star connection.

<<Structure of Each Element of Matrix Converter>>

Each element of the matrix converter (1) will be described in detail below.

<LC Filter Circuit (6)>

The LC filter circuit (6) is an LC filter which has three coils (L11, L12, L13) and three filter capacitors (C11, C12, C13) corresponding to the respective phases of the input three-phase alternating current. The LC filter circuit (6) is provided to prevent a high-frequency current generated due to on/off operations of switching elements (described later) of the converter section (2), etc., from flowing into the three-phase alternating current power supply (7). Specifically, according to this example, the phase voltage (Vr), the phase voltage (Vs), and the phase voltage (Vt) of the three-phase alternating current power supply (7) are input to the coil (L11), the coil (L12), and the coil (L13), respectively.

<Converter Section (2)>

—General Structure—

The converter section (2) is configured to perform switching of the input three-phase alternating current by switching elements (described later) and convert the input three-phase alternating current to two-level direct current voltage for output. The switching of the converter section (2) is controlled by the control unit (5).

Figure 2:
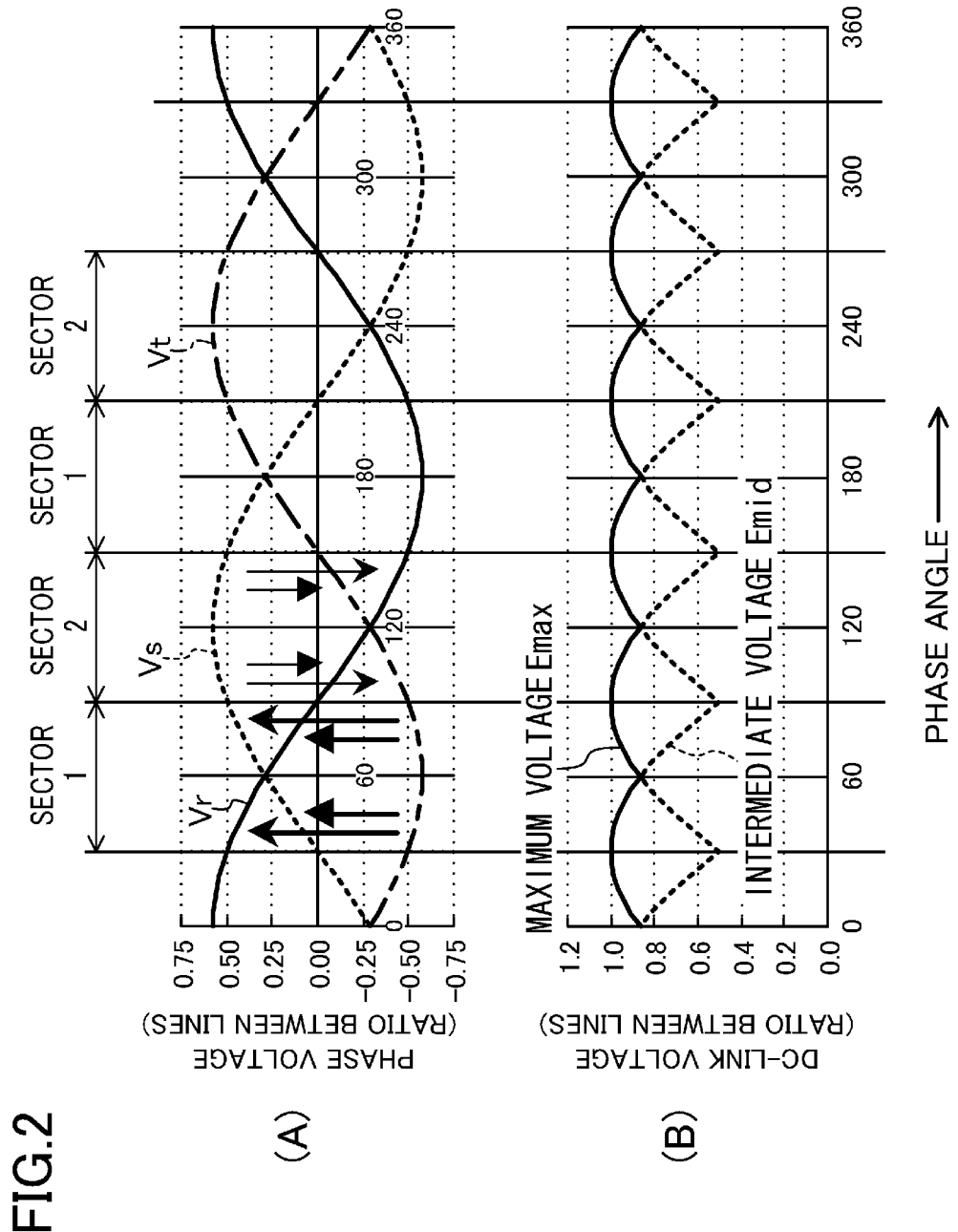
FIG. 2 shows waveforms for explaining an input three-phase alternating current and a two-level direct current voltage output from a converter section.

FIG. 2 shows waveforms for explaining the input three-phase alternating current and the two-level direct current voltage output from the converter section (2). Specifically, FIG. 2(A) shows the waveforms of the normalized phase voltages (Vr, Vs, Vt) of the input three-phase alternating current, and FIG. 2(B) shows waveforms of the outputs from the converter section (2). As shown in FIG. 2(A), these phase voltages (Vr, Vs, Vt) have a period in which the voltages of two phases are positive and the voltage of one phase is negative (hereinafter referred to as "Sector 1"), and a period in which the voltages of two phases are negative and the voltage of one phase is positive (hereinafter referred to as "Sector 2"). Sector 1 and Sector 2 alternate at every 60 phase angles.

The converter section (2) selects a phase to be a reference of the direct current voltages (hereinafter referred to as a "reference phase") for each sector, and selects, on a time division basis, one of the line voltages between the reference phase and each of the remaining two phases, thereby outputting the two-level direct current voltage. Specifically, based on the phase voltage of the reference phase, a line voltage between one of the remaining two phases whose absolute value is larger than the other phase (hereinafter referred to as a "maximum phase") and the reference phase is output as a maximum voltage (Emax), and a line voltage between the other phase (hereinafter referred to as an "intermediate phase") and the reference phase is output as an intermediate voltage (Emid).

In the present embodiment, the reference phase is a phase whose voltage has the largest absolute value in the sector. For example, in Sector 1, the phase having the largest voltage absolute value is the phase t. Thus, the phase t is the reference phase (see FIG. 2(A)). Further, in the input three-phase alternating current, the relationship of the magnitude of the voltages of the two phases other than the reference phase changes between the first half period (the phase angle of 30°) and the second half period (the phase angle of 30°) of the sector (see FIG. 2(A)). That is, the phase to be a maximum phase and the phase to be an intermediate phase change between the first half and the second half of the sector. For example, the phase voltage (Vr) is higher than the phase voltage (Vs) during the period of the phase angle of 30°-60° of Sector 1. That is, the phase r is the maximum phase, and the phase is the intermediate phase during the period of the phase angle of 30°-60°. In contrast, the phase voltage (Vs) is higher than the phase voltage (Vr) during the period of the phase angle of 60°-90° of Sector 1. That is, the phase s is the maximum phase, and the phase r is the intermediate phase during the period of the phase angle of 60°-90°.

—Configuration—

The converter section (2) of the present embodiment includes, as specifically shown in FIG. 1, three switching elements (Srp, Ssp, Stp) which form the upper arm, and three switching elements (Srn, Ssn, Stn) which form the lower arm. In the present embodiment, the upper and lower arm switching elements (Srp, . . . , Stn) are one-way switching elements. More specifically, so-called reverse blocking IGBTs are used as the switching elements (Srp, . . . , Stn). In FIG. 1, symbols of diode are used to indicate the collectors of the respective switching elements (Srp, . . . , Stn) of the converter section (2). However, these diodes are not actually connected to the switching elements independently, but FIG. 1 schematically shows that the switching elements (Srp, . . . , Stn) block reverse voltages (the same in the other drawings). That is, due to the adoption of the reverse blocking IGBTs, it is not necessary to provide a reverse blocking diode, which is necessary in conventional converter circuits, in the converter section (2). Thus, the conduction loss in the converter section (2) can be reduced.

Specifically, the upper-arm switching elements (Srp, Ssp, Stp) are connected together in parallel on the emitter side. On the other hand, the lower-arm switching elements (Srn, Ssn, Stn) are connected together in parallel on the collector side. The upper-arm switching elements (Srp, Ssp, Stp) correspond to the lower-arm switching elements (Srn, Ssn, Stn), one by one, and emitters of the lower-arm switching elements (Srn, Ssn, Stn) are connected to the collectors of the corresponding upper-arm switching elements (Srp, Ssp, Stp). In the descriptions below, the bus connected to the emitter side of the upper-arm switching elements (Srp, Ssp, Stp) is called a first direct current link (L1), and the bus connected to the collector side of the lower-arm switching elements (Srn, Ssn, Stn) is called a second direct current link (L2). The first and second direct current links (L1, L2) are example output lines of the present invention.

As shown in FIG. 1, one end of the coil (L11) of the LC filter circuit (6) is connected to a connection node between the switching element (Srp) and the switching element (Srn) to input a phase voltage (Vr) from the three-phase alternating current power supply (7) through the coil (L11). Further, a phase voltage (Vs) is input to a connection node between the switching element (Ssp) and the switching element (Ssn) from the three-phase alternating current power supply (7) through the coil (L12). Similarly, a phase voltage (Vt) is input to a connection node between the switching element (Stp) and the switching element (Stn) from the three-phase alternating current power supply (7) through the coil (L13). That is, the converter section (2) includes three pairs of switching elements (Srp, . . . , Stn), each pair including two switching elements connected in series between the first direct current link (L1) and the second direct current link (L2), and the phases of the input three-phase alternating current are connected to the nodes between the series-connected switching elements one by one.

<Clamp Circuit (4)>

The clamp circuit (4) includes two capacitors (C1, C2) and three diodes (D1, D2, D3). In the clamp circuit (4), one end of the capacitor (C1) is connected to the first direct current link (L1), and the other end of the capacitor (C1) is connected to an anode of the diode (D1). A cathode of the diode (D1) is connected to one end of the capacitor (C2), and the other end of the capacitor (C2) is connected to the second direct current link (L2).

An anode of the diode (D2) is connected to the cathode of the diode (D1). A cathode of the diode (D2) is connected to the first direct current link (L1). A cathode of the diode (D3)

is connected to the anode of the diode (D1). An anode of the diode (D3) is connected to the second direct current link (L2).

<Inverter Section (3)>

The inverter section (3) is configured to convert the direct current voltages output from the converter section (2) to an output three-phase alternating current having phase voltages Vu, Vv, Vw, and supply the output three-phase alternating current to the motor (8). Specifically, the inverter section (3) of the present embodiment includes, as shown in FIG. 1, three switching elements (Sup, Svp, Swp) and three diodes (Dup, Dvp, Dwp) which form an upper arm, and three switching elements (Sun, Svn, Swn) and three diodes (Dun, Dvn, Dwn) which form a lower arm. In the inverter section (3), general IGBTs are used as the upper and lower arm switching elements (Sup, . . . , Swn).

In the inverter section (3), the upper-arm switching elements (Sup, Svp, Swp) are connected together in parallel on the collector side, and are connected to the first direct current link (L1). Further, the upper-arm switching elements (Sup, Svp, Swp) are connected in antiparallel to the diodes (Dup, Dvp, Dwp), respectively, between the collector and the emitter.

On the other hand, the lower-arm switching elements (Sun, Svn, Swn) are connected together in parallel on the emitter side, and are connected to the second direct current link (L2). Further, the lower-arm switching elements (Sun, Svn, Swn) are connected in antiparallel to the diodes (Dun, Dvn, Dwn), respectively, between the collector and the emitter.

The upper-arm switching elements (Sup, Svp, Swp) correspond to the lower-arm switching elements (Sun, Svn, Swn), one by one, and emitters of the upper-arm switching elements (Sup, Svp, Swp) are connected to the collectors of the corresponding lower-arm switching elements (Sun, Svn, Swn).

In the inverter section (3), a phase voltage (Vu) is output from a connection node between the switching element (Sup) and the switching element (Sun). A phase voltage (Vv) is output from a connection node between the switching element (Svp) and the switching element (Svn). A phase voltage (Vw) is output from a connection node between the switching element (Swp) and the switching element (Swn). These phase voltages (Vu, Vv, Vw) are supplied to the motor (8).

<Control Unit (5)>

The control unit (5) controls the converter section (2) and the inverter section (3) by pulse width modulation (PWM). For example, the control unit (5) controls on/off operations of the switching elements (Srp, . . . , Stn) of the converter section (2) such that, taking one phase of the input three-phase alternating current as a reference phase, the line voltages between the reference phase and each of the other phases are output to the first and second direct current links (L1, L2) on a time division basis.

Figure 3:
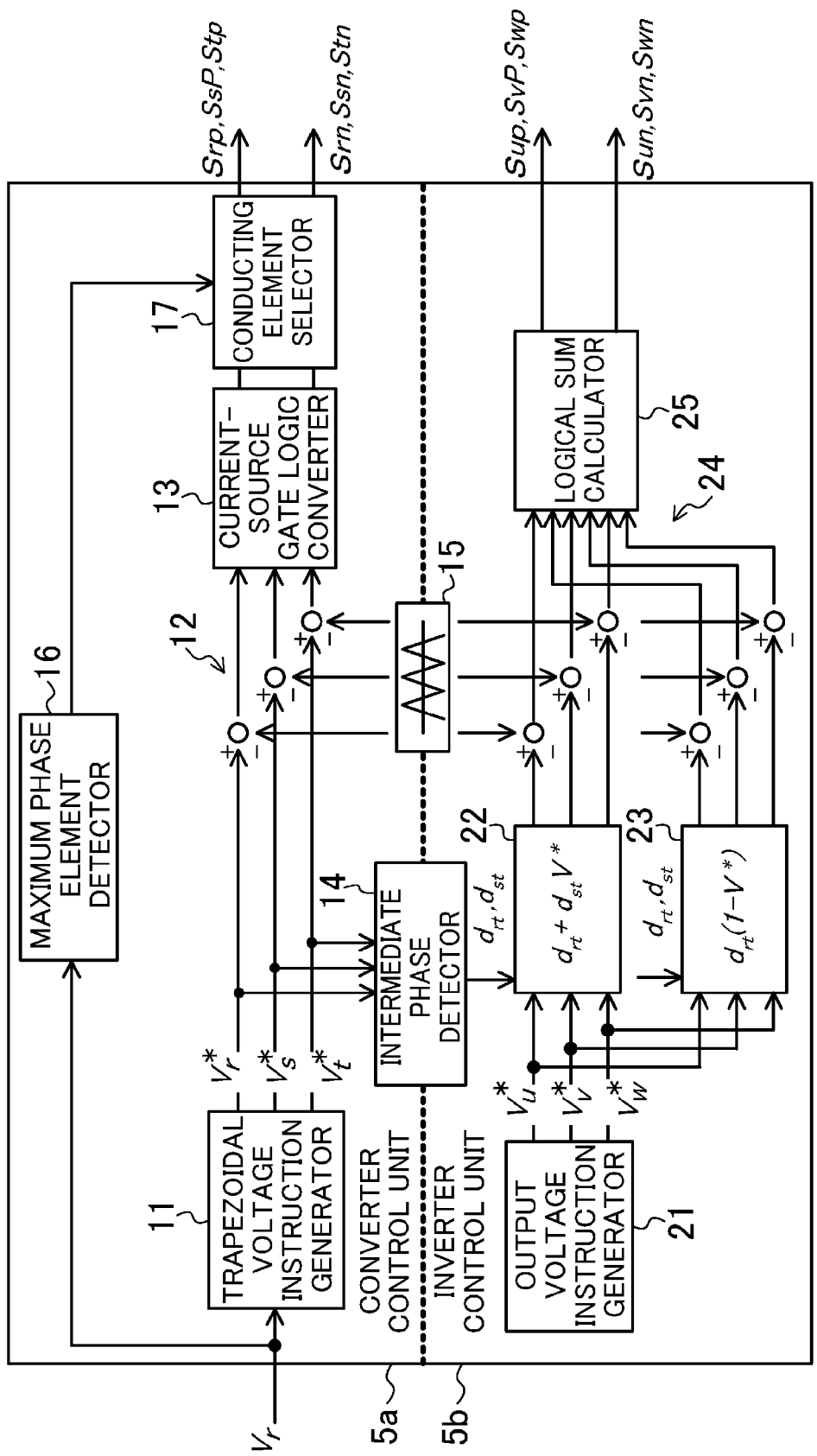
FIG. 3 shows a block diagram which illustrates a configuration of a control unit according to the first embodiment.

FIG. 3 shows a block diagram which illustrates a configuration of the control unit (5) according to the present embodiment. As shown in FIG. 3, the control unit (5) includes a converter control unit (5a) which controls the converter section (2), and an inverter control unit (5b) which controls the inverter section (3). The converter control unit (5a) includes a trapezoidal voltage instruction generator (11), a comparator (12), a current-source gate logic converter (13), an intermediate phase detector (14), a carrier signal generator (15), a maximum phase element detector (16), and a conducting element selector (17). The intermediate phase detector (14) and the carrier signal generator (15) are shared with the inverter control unit (5b). Further, the inverter control unit (5b) includes an output voltage instruction generator (21), a calculator (22), a calculator (23), a comparator (24), and a logical sum calculator (25). Each structural element of the control unit (5) will be described below.

—Trapezoidal Voltage Instruction Generator (11)—

The trapezoidal voltage instruction generator (11) receives a power source synchronization signal (Vr), and based on this power source synchronization signal (Vr), generates values of the inclination regions of the trapezoidal voltage instruction signals (Vr*, Vs*, Vt*) such that the values correspond to the respective phases of the input three-phase alternating current. The power source synchronization signal (Vr) is synchronized to any one of the phases of the input three-phase alternating current.

More specifically, the trapezoidal voltage instruction generator (11) of the present embodiment calculates the values of the inclination regions of the trapezoidal voltage instruction signal (Vr*, Vs*, Vt*) using the formula below, sets the values in a table beforehand, and outputs the values of the inclination region of the trapezoidal voltage instruction signal (Vr*, Vs*, Vt*) at the time of operation, using the table.

$$V_u^*=1,\ V_v^*=\sqrt{3}\tan(\theta-\pi/6),\ V_w^*=1 \quad \text{[Formula 1]}$$

Here, the phase angle θ synchronizes with the phase voltage (Vr) of the input three-phase alternating current.

Figure 4:
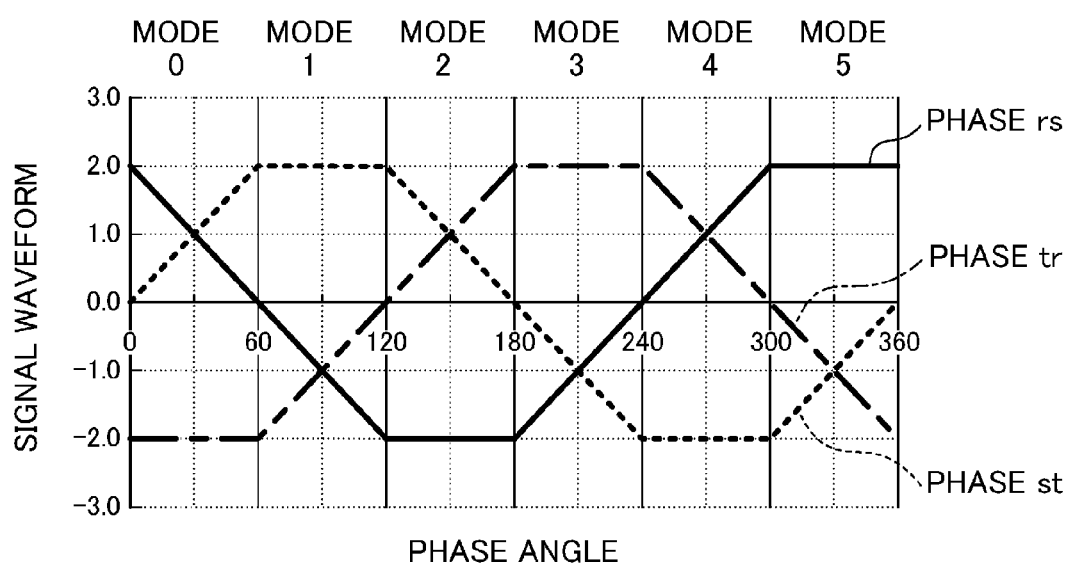
FIG. 4 shows waveforms of a trapezoidal voltage instruction signal.

FIG. 4 shows waveforms of the trapezoidal voltage instruction signals (Vr*, Vs*, Vt*). Each of the trapezoidal voltage instruction signals (Vr*, Vs*, Vt*) represents a duty cycle of each of the phases in the converter section (2). In the present embodiment, a current flows in the upper arm when the duty cycle is a positive value, and a current flows in the lower arm when the duty cycle is a negative value.

—Carrier Signal Generator (15)—

The carrier signal generator (15) generates a carrier signal. The carrier signal has a triangle waveform.

—Comparator (12)—

The comparator (12) compares the trapezoidal voltage instruction signal (Vr*, Vs*, Vt*) generated by the trapezoidal voltage instruction generator (11) and the carrier signal generated by the carrier signal generator (15).

—Current-Source Gate Logic Converter (13)—

The current-source gate logic converter (13) outputs six gate signals based on a result of comparison by the comparator (12). The gate signals are for controlling the gates of the six switching elements (Srp, . . . , Stn) of the converter section (2).

The current-source gate logic converter (13) generates the gate signals such that the on/off operations of the switching elements of the maximum phase and the intermediate phase are complementarily repeated, using the duty cycle (drt, dst). That is, the current-source gate logic converter (13) generates signals for conventional PWM control (see, e.g., Patent Document 1). The gate signals are input to the switching elements (Srp, . . . , Stn) of the converter section (2) via the conducting element selector (17).

—Intermediate Phase Detector (14)—

The intermediate phase detector (14) detects the duty cycle (drt, dst) of the intermediate phase, based on the trapezoidal voltage instruction signals (Vr*, Vs*, Vt*).

—Maximum Phase Element Detector (16)—

The maximum phase element detector (16) detects the maximum phase from among the phase voltages (Vr, Vs, Vt) of the input three-phase alternating current, based on the power source synchronization signal (Vr).

—Conducting Element Selector (17)—

Based on the detection result of the maximum phase element detector (16), the conducting element selector (17) applies the output of the current-source gate logic converter (13) to the gate (i.e., a control terminal) of one of the switching elements (Srp, . . . , Stn) corresponding to the maximum phase, to which a forward bias is applied, and applies predetermined gate voltages to the other switching element corresponding to the maximum phase, the switching elements corresponding to the intermediate phase, and the switching elements corresponding to the reference phase, irrespective of the output of the current-source gate logic converter (13). In other words, the control unit (5) of the present embodiment applies predetermined gate voltages to the switching elements to which reverse biases are applied, of the six switching elements (Srp, . . . , Stn). Here, the predetermined gate voltage is equal to a voltage at which a current can flow between the collector and the emitter of the switching element, but a voltage higher or lower than the equal voltage may be appropriately selected according to a leakage current value.

—Output Voltage Instruction Generator (21)—

The output voltage instruction generator (21) generates an output voltage instruction signal (Vu*, Vv*, Vw*) output to the inverter section (3).

—Calculator (22, 23)—

The calculator (22) outputs drt+dstV* (V*: a voltage vector of each phase) based on the output voltage instruction signal (Vu*, Vv*, Vw*) and the duty cycle (drt, dst).

Further, the calculator (23) outputs drt(1−V*) (V*: a voltage vector of each phase) based on the output voltage instruction signal (Vu*, Vv*, Vw*) and the duty cycle (drt).

—Comparator (24)—

The comparator (24) compares each of the results of calculation by the two calculators (22, 23) with the carrier signal generated by the carrier signal generator (15).

—Logical Sum Calculator (25)—

The logical sum calculator (25) outputs gate signals based on the comparison results of the comparator (24). The gate signals are for controlling on/off operations of the six switching elements (Sup, . . . , Swn) of the inverter section (3).

<<Operation of Matrix Converter (1)>>

Figure 5:
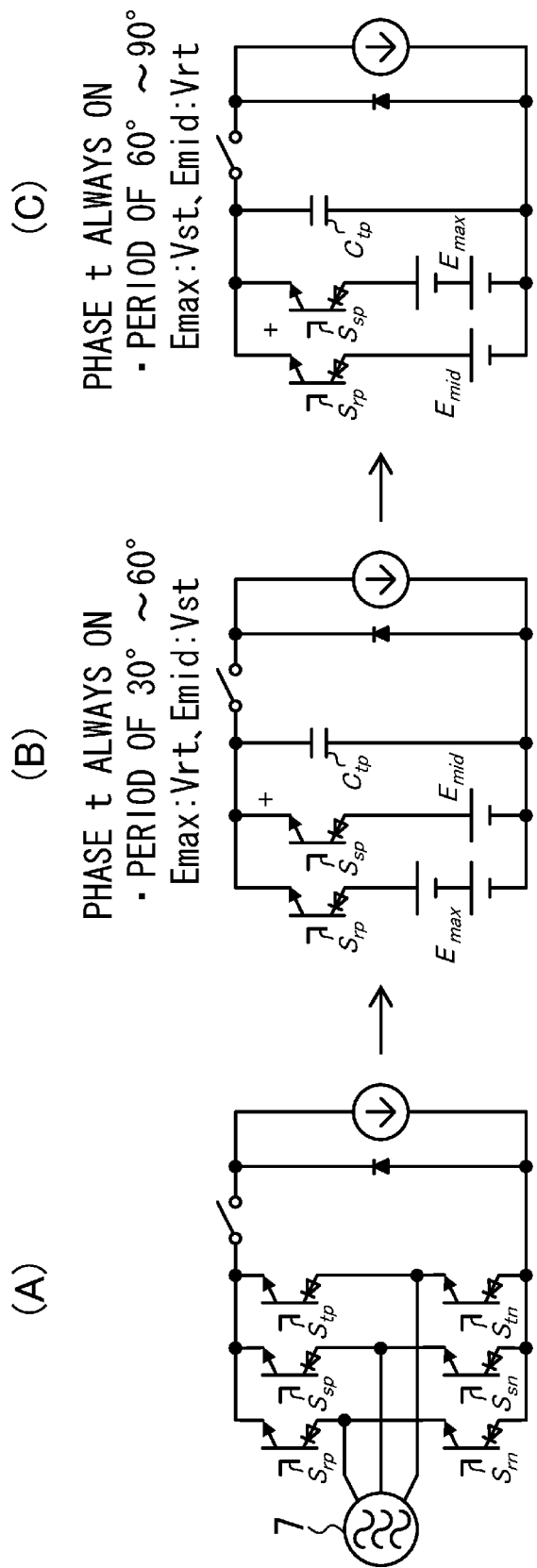
FIG. 5 shows diagrams for explaining the states of a converter section in Sector 1.

FIG. 5 shows diagrams for explaining the states of the converter section (2) in Sector 1. FIG. 5(A) is an equivalent circuit diagram which schematically illustrates a main part of the converter section (2). FIG. 5(B) is an equivalent circuit diagram showing the state during the period of the phase angle of 30°-60°. FIG. 5(C) is an equivalent circuit diagram showing the state during the period of the phase angle of 60°-90°. The operation of the matrix converter (1) will be explained below by dividing Sector 1 into the period of the phase angle of 30°-60° and the period of the phase angle of 60°-90°.

<Period of Phase Angle of 30°-60°>

Figure 6:
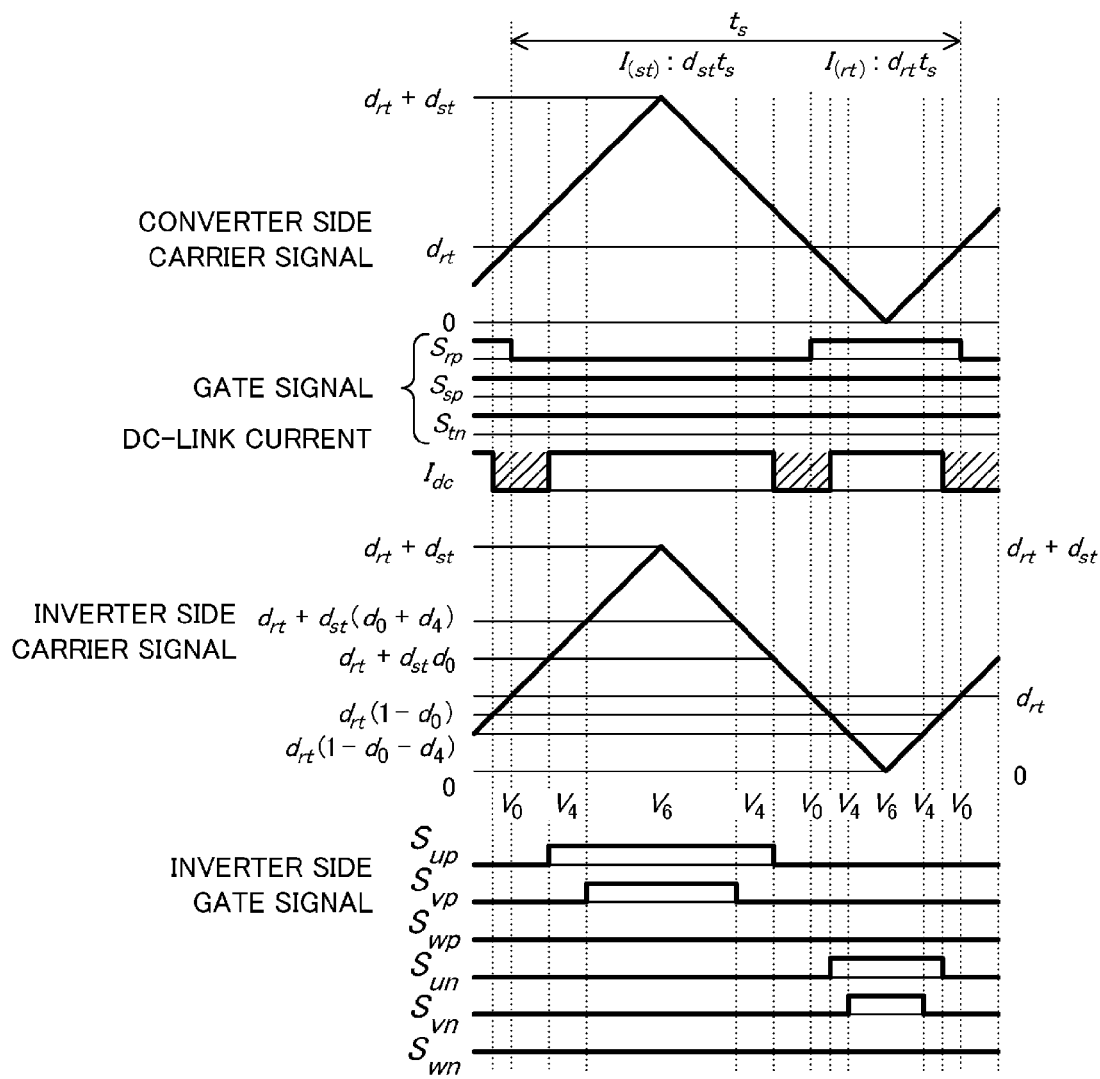
FIG. 6 shows a diagram for explaining pulse width modulation (PWM) by a matrix converter during a period of a phase angle of 30°-60° of Sector 1.

FIG. 6 shows a diagram for explaining the pulse width modulation (PWM) by the matrix converter (1) during the period of the phase angle of 30°-60° of Sector 1. In FIG. 6, is a carrier cycle; I(rt) is a current instruction; I(st) is a current instruction; drt and dst are duty cycles; Idc is a DC link current; V0, V4 and V6 are voltage instructions; d0 is a duty cycle corresponding to the voltage instruction V0; and d4 is a duty cycle corresponding to the voltage instruction V4.

Further, Srp, Ssp and Stn are the gate signals input to the switching elements (Srp, Ssp, Stn) of the converter section (2), respectively. Sup, Svp and Swp are the gate signals input to the upper-arm switching elements (Sup, Svp, Swp) of the inverter section (3), respectively. Sun, Svn and Swn are the gate signals input to the lower-arm switching elements (Sun, Svn, Swn). As shown in FIG. 6, a carrier signal having a triangle waveform is used in the matrix converter (1).

In this period of Sector 1, the phase t is a reference phase (see FIG. 2(A)). The phase r is the maximum phase, and the phase s is the intermediate phase in this period. In this case, the control unit (5) controls the on/off operations of only the switching element (Srp) corresponding to the maximum phase (i.e., the phase r) according to the duty cycle (drt, dst), and applies the above-mentioned predetermined gate voltages to the other switching elements (Ssp, Stp, Srn, Ssn, Stn) of the converter section (2) (see FIG. 6). In this case, since the switching element (Stp) corresponding to the phase t (the reference phase) has predetermined junction capacitance, the switching element (Stp) is shown as a capacitor (Ctp) in FIG. 5(B).

If the switching elements (Srp, . . . , Stn) are controlled as described above, the voltage between the collector of the switching element (Srp) and the second direct current link (L2) is the maximum voltage (Emax), and the voltage between the collector of the switching element (Ssp) and the second direct current link (L2) is the intermediate voltage (Emid). That is, a reverse bias is applied to the switching element (Ssp). The switching element (Ssp) is a one-way switch, specifically, a reverse blocking IGBT. Thus, even if a reverse bias is applied to the switching element (Ssp), no short circuit occurs between the direct current links (L1, L2). Only the maximum voltage (Emax) is generated between the direct current links (L1, L2) since the maximum voltage (Emax) and the intermediate voltage (Emid) have a potential difference.

Turning to the switching elements (Srn, Ssn, Stp) not shown in FIG. 5(B), reverse biases are applied to all of these switching elements. Specifically, the maximum voltage (Emax) is applied to the switching element (Srn); the intermediate voltage (Emid) is applied to the switching element (Ssn); the maximum voltage (Emax) or the intermediate voltage (Emid) is applied to the switching element (Stp). These switching elements (Srn, Ssn, Stp) are one-way switches. Thus, no current flows even if gate voltages are applied to these switching elements.

As described above, the on/off operation of only the switching element which corresponds to the maximum phase and to which a forward direction voltage is applied, is switched by the duty cycle (drt, dst), and the other switching elements are fixed to the state in which predetermined gate voltages are applied, thereby making it possible to output a direct current voltage in which an alternating-current voltage component is superimposed on a direct current voltage component.

The direct current voltage output from the converter section (2) is input to the inverter section (3). The on/off operations of the six switching elements (Sup, . . . , Swn) of the inverter section (3) are controlled by the gate signals output from the control unit (5). As a result, the inverter section (3) outputs a predetermined alternating-current voltage to the motor (8).

<Period of Phase Angle of 60°-90°>

Figure 7:
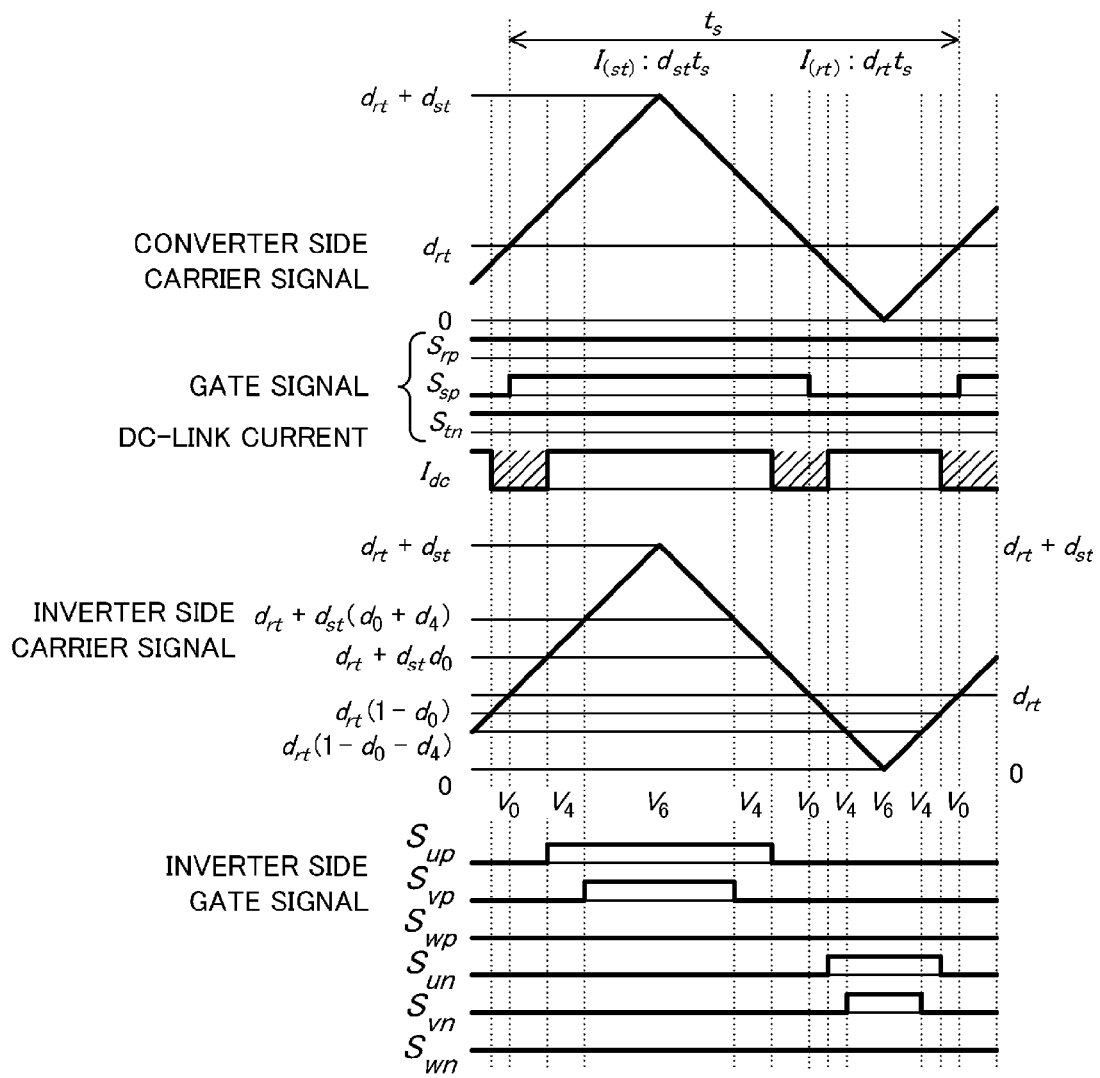
FIG. 7 shows a diagram for explaining pulse width modulation (PWM) by a matrix converter (1) during a period of a phase angle of 60°-90° of Sector 1.

The phase t is the reference phase in this period of Sector 1, as well (see FIG. 2(A)). On the other hand, the maximum phase of this period is the phase s, and the intermediate phase is the phase r. FIG. 7 shows a diagram for explaining pulse width modulation (PWM) by the matrix converter (1) during the period of the phase angle of 60°-90° of Sector 1. In this period, the control unit (5) controls the on/off operations of only the switching element (Ssp) corresponding to the maximum phase (i.e., the phase s) according to the duty cycle (drt, dst), and applies the predetermined gate voltages to the other switching elements (Srp, Stp, Srn, Ssn, Stn) of the converter section (2) as shown in FIG. 7. In this state, reverse biases are applied to the switching elements of the converter section (2), except the switching element (Ssp). The switching elements (Srp, . . . , Stn) of the converter section (2) are one-way switches. Thus, no current flows even if the gate voltages are applied to the switching elements to which the reverse biases are applied.

<Operation in Sector 2>

Figure 8:
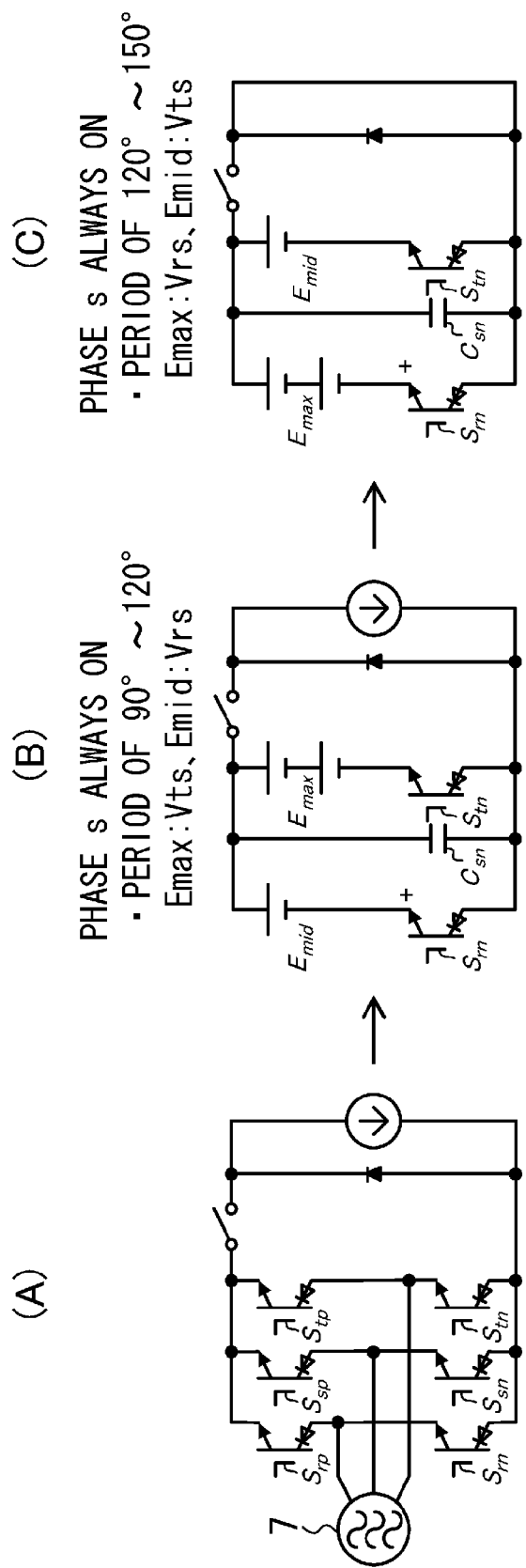
FIG. 8 shows diagrams for explaining the states of a converter section in Sector 2.
Figure 9:
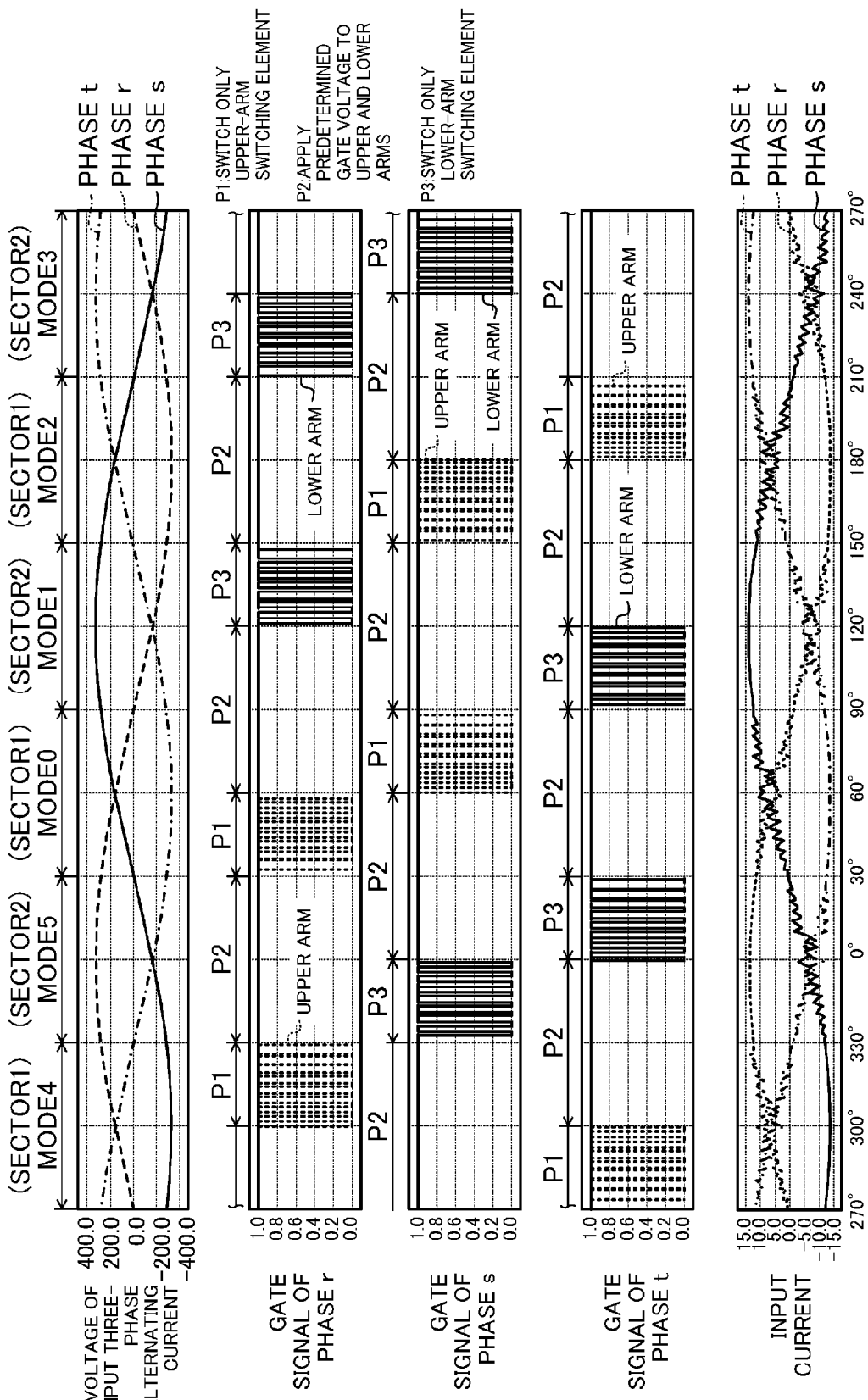
FIG. 9 shows waveforms of the gate signal of the respective phases, the voltages of the input three-phase alternating current, and the input currents according to the first embodiment.

FIG. 8 shows diagrams for explaining the states of the converter section (2) in Sector 2. FIG. 8(A) is an equivalent circuit diagram which schematically illustrates a main part of the converter section (2). FIG. 8(B) is an equivalent circuit diagram showing the state during the period of the phase angle of 90°-120°. FIG. 8(C) is an equivalent circuit diagram showing the state during the period of the phase angle of 120°-150°. In Sector 2, the matrix converter (1) controls the on/off operations of the lower-arm switching element corresponding to the reference phase by the duty cycle (drt, dst) based on the relationship between the phase voltages (Vr, Vs, Vt), and the other switching elements are fixed to the state in which predetermined gate voltages are applied. In Sector 2, as well, the phase to be a maximum phase and the phase to be an intermediate phase change every phase angle of 30°. Thus, similar to the case in Sector 1, control is performed by dividing the sector into periods of 30°. In the matrix converter (1) of the present embodiment, operations similar to the operations described above are repeated. The waveforms of the gate signals of the respective phases, the voltages of the input three-phase alternating current, and the input currents are shown in FIG. 9. As shown in FIG. 9, in the present embodiment, the on/off operations of one of the switching elements corresponding to any one of the phases are controlled by a predetermined duty cycle.

Advantages of the Present Embodiment

Reverse blocking IGBTs are known to have a characteristic in which a relatively large leakage current is generated if a reverse bias is applied between the collector and the emitter, but the leakage current is reduced if a gate voltage is applied to the reverse blocking IGBT while a reverse bias is applied. In view of this, the control unit (5) of the matrix converter (1) controls switching elements such that a predetermined gate voltage is applied to a switching element to which a reverse bias is applied. Thus, the leakage current of the switching element (Srp, . . . , Stn) at the time when a reverse bias is applied can be reduced even if a reverse blocking IGBT is used as the switching element (Srp, . . . , Stn). If the reverse blocking IGBT is used, a reverse blocking diode which is conventionally needed is not necessary, and it is possible to reduce the conduction loss of the converter section (2).

Variation of First Embodiment

Figure 10:
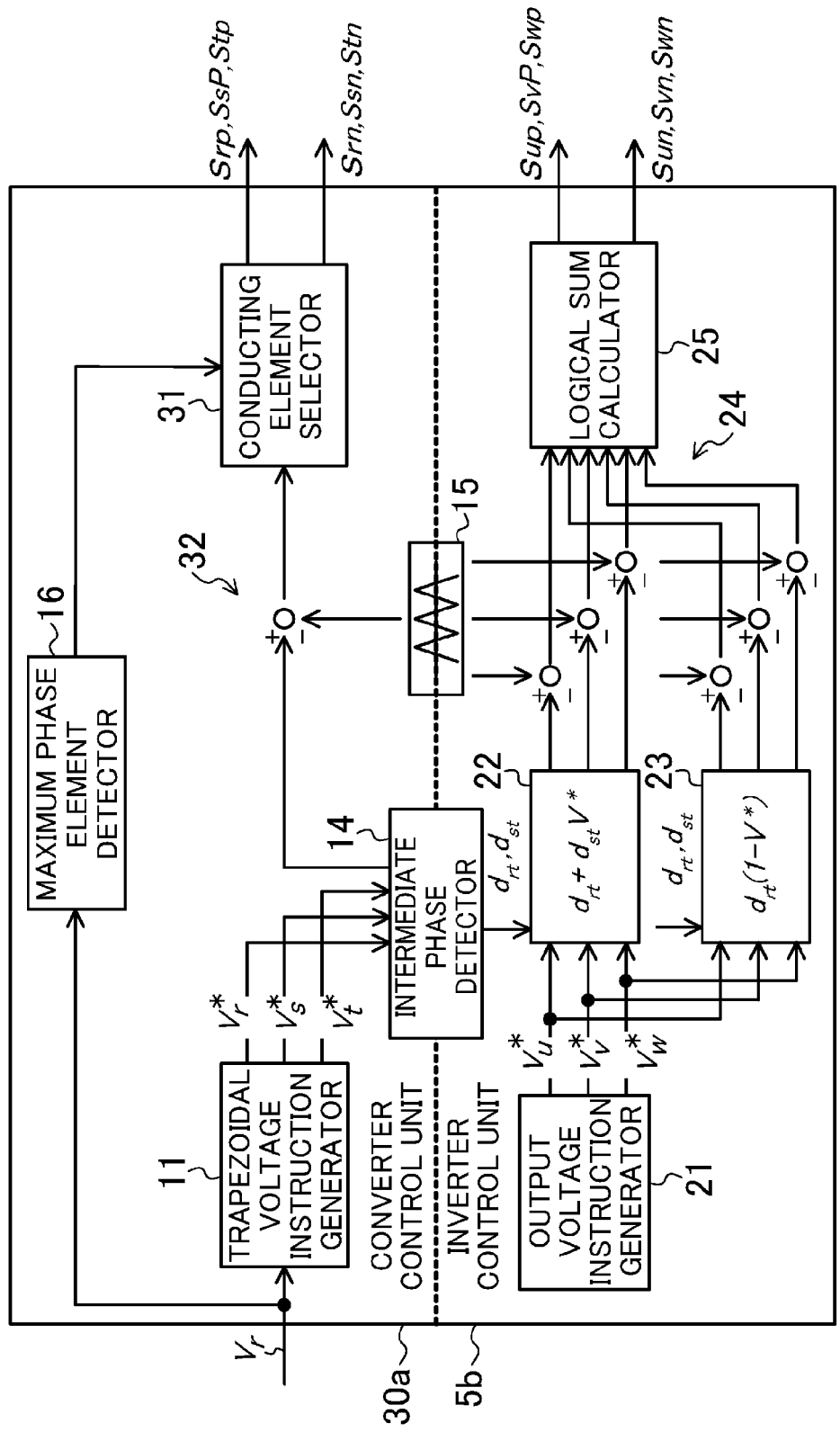
FIG. 10 shows a block diagram which illustrates a configuration of a control unit according to a variation of the first embodiment.

Another example of the control unit will be described as a variation of the first embodiment. FIG. 10 shows a block diagram which illustrates a configuration of the control unit (30) according to the present variation. The structure of the converter control unit (5a) of the control unit (5) according to the first embodiment is changed in the control unit (30). Specifically, the converter control unit (30a) of the control unit (30) includes a conducting element selector (31) and a comparator (32), instead of the comparator (12), the current-source gate logic converter (13) and the conducting element selector (17).

Figure 11:
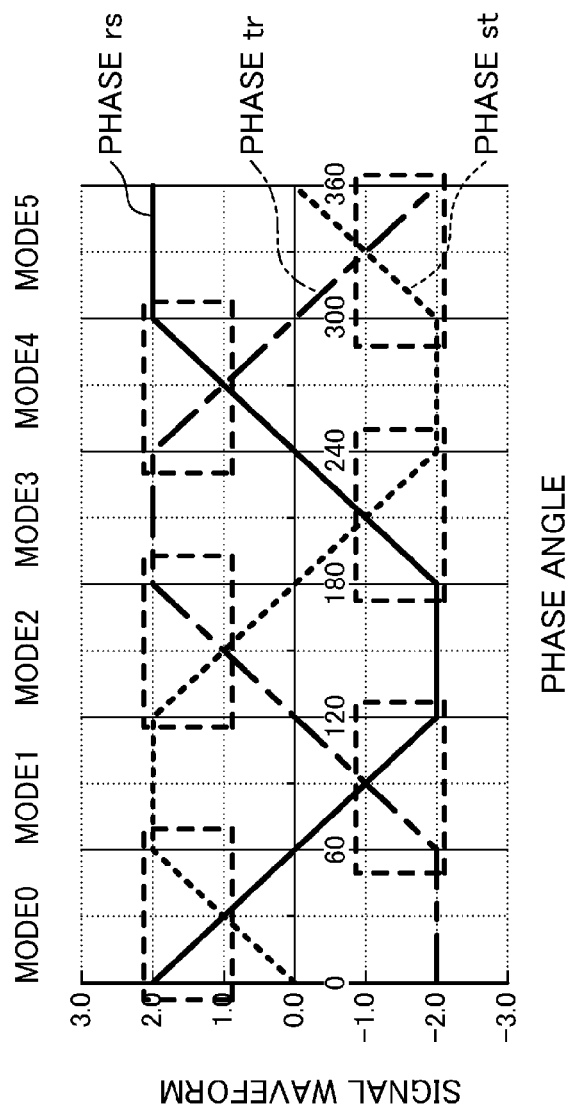
FIG. 11 illustrates the relationship between the transition states of the reference phase, the maximum phase, and the intermediate phase, and inclination regions of trapezoidal voltage instruction signals.

The comparator (32) compares a duty cycle of the intermediate phase obtained by the intermediate phase detector (14) and the output of the carrier signal generator (15) to obtain a duty cycle of the intermediate phase, and outputs the result to the conducting element selector (31). The conducting element selector (31) of the present variation obtains a duty cycle of the maximum phase, based on the duty cycle of the intermediate phase input by the comparator (32), and generates gate voltages to be output to the switching elements (Srp, . . . , Stn). FIG. 11 illustrates the relationship between the transition states (Mode 0, Mode 1, . . . ) of the reference phase, the maximum phase, and the intermediate phase, and the inclination regions of the trapezoidal voltage instruction signals (Vr*, Vs*, Vt*). As shown in FIG. 11, the reference phase, the maximum phase and the intermediate phase of the input three-phase alternating current change in a given cycle. Thus, if the duty cycle corresponding to any one of the phases is obtained, the duty cycles of the other phases can also be determined. Based on the detection result of the maximum phase element detector (16), the conducting element selector (31) applies, according to the obtained duty cycle, a gate voltage to the gate of one of the switching elements (Srp, . . . , Stn) corresponding to the maximum phase to which a forward bias is applied, and applies predetermined gate voltages to the other switching element corresponding to the maximum phase, the switching elements corresponding to the intermediate phase, and the switching elements corresponding to the reference phase.

The structure of the converter control unit (30a) can be simplified by generating six gate voltages from the signal (i.e., the duty cycle) of only one phase as described above.

Second Embodiment of the Invention

Figure 12:
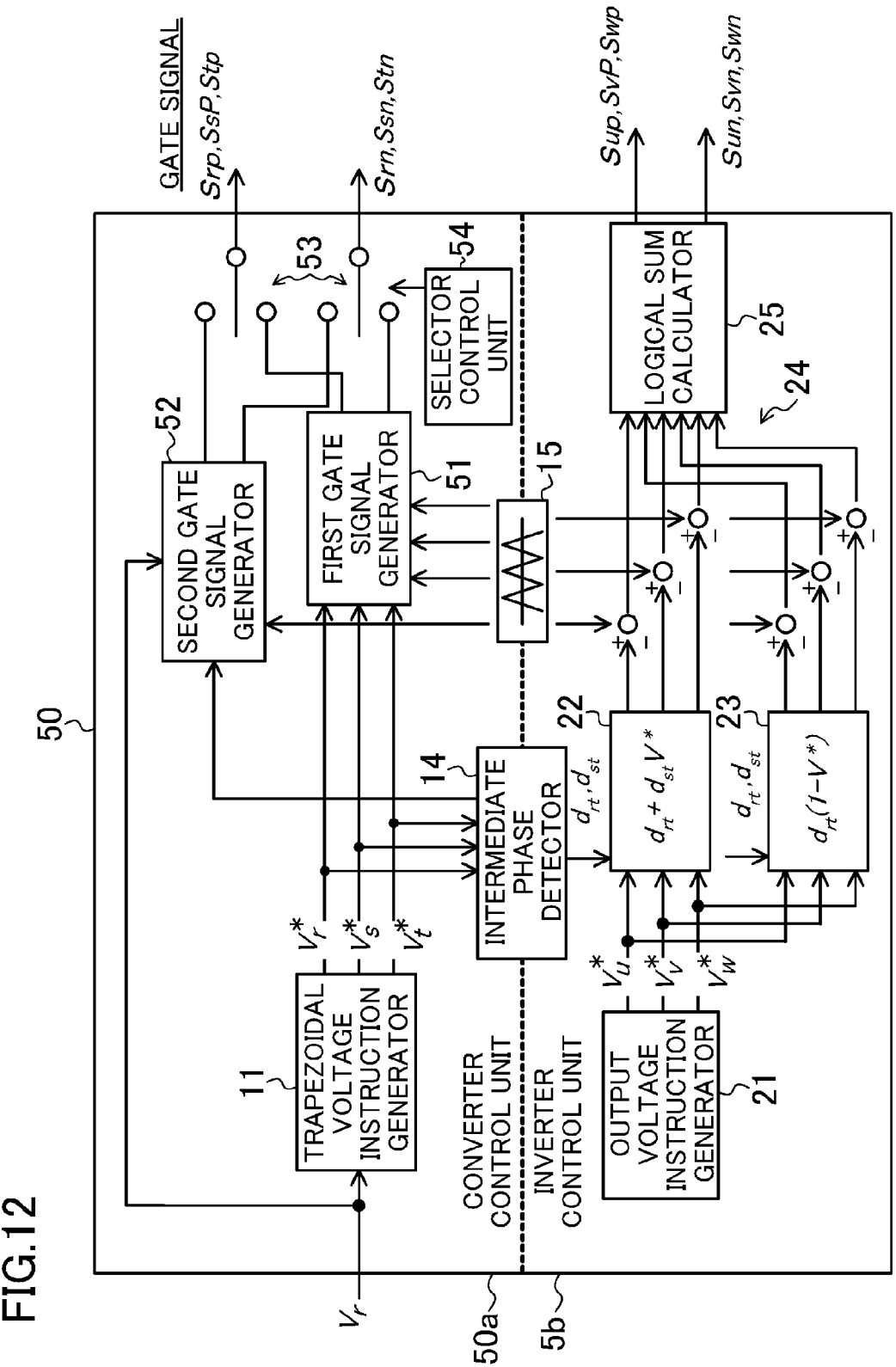
FIG. 12 shows a block diagram which illustrates a configuration of a control unit according to the second embodiment of the present invention.

Another example configuration of the control unit will be described in the second embodiment. FIG. 12 shows a block diagram which illustrates a configuration of a control unit (50) according to the second embodiment of the present invention. The control unit (50) includes a converter control unit (50a) and an inverter control unit (5b). That is, the control unit (50) is different from the control unit of the first embodiment in the configuration of the converter control unit (50a). The converter control unit (50a) of the present embodiment includes a trapezoidal voltage instruction generator (11), an intermediate phase detector (14), a carrier signal generator (15), a first gate signal generator (51), a second gate signal generator (52), a selector (53), and a selector control unit (54). The intermediate phase detector (14) and the carrier signal generator (15) are shared with the inverter control unit (5b).

The first gate signal generator (51) includes the comparator (12) and the current-source gate logic converter (13) described in the first embodiment. The output signal of the current-source gate logic converter (13) is output to the output signal selector (53). That is, the first gate signal generator (51) generates a signal for conventional PWM control (see, e.g., Patent Document 1) and outputs the signal to the selector (53). Two phases of the three-phase alternating current are modulated by applying the gate signal output from the first gate signal generator (51) to each of the switching elements (Srp, . . . , Stn).

The second gate signal generator (52) includes the maximum phase element detector (16), the comparator (32) and the conducting element selector (31) described in the variation, and outputs the output of the conducting element selector (31) to the selector (53). That is, the second gate signal generator (52) outputs the same gate signal as in the converter control unit (30a) of the variation to the selector (53). Thus, one phase of the three-phase alternating current is modulated by applying the gate signal output from the second gate signal generator (52) to each of the switching elements (Srp, . . . , Stn). In the following description, the patterns of the gate signals output from the first and second gate signal generators (51, 52) are called gate patterns A, B, respectively.

Under the control of the selector control unit (54), the selector (53) selects one of the gate signals from the first gate signal generator (51) or the gate signal from the second gate signal generator (52), and outputs the selected gate signal to the switching elements (Srp, . . . , Stn) of the converter section (2). That is, a signal having a gate pattern A or a signal having a gate pattern B is selectively output from the selector (53).

The selector control unit (54) controls the selector (53) such that the selector (53) selects the output of the first gate signal generator (51) during part of the period of a sector, and selects the output of the second gate signal generator (52) during the rest of the period of the sector. In the following description, the period in which the selector (53) selects the output of the first gate signal generator (51), that is, the period controlled by the gate pattern A, is called a two-phase modulation period, and the period in which the selector (53) selects the output of the second gate signal generator (52) is called a one-phase modulation period. During the two-phase modulation period, the on/off operations of the switching element (Srp, . . . , Stn) to which a forward bias is applied, and one of the switching elements (Srp, . . . , Stn) corresponding to the intermediate phase from which current flows are complementarily controlled according to the predetermined duty cycle (drt, dst). On the other hand, during the one-phase modulation period, the on/off operations of only the switching element (Srp, . . . , Stn) to which a forward bias is applied is controlled according to the predetermined duty cycle (drt, dst).

In the present embodiment, the two-phase modulation period (i.e., the period controlled by the gate pattern A) includes a period in which the voltage of the filter capacitor (C11, C12, C13) corresponding to the intermediate phase is larger than the voltage of the filter capacitor (C11, C12, C13) corresponding to the maximum phase, more specifically, a period of a 30-degree phase angle in the middle of which period (or phase angle) the intermediate phase and the maximum phase of the input three-phase alternating current change.

<Operation of Matrix Converter of the Second Embodiment>

Figure 13:
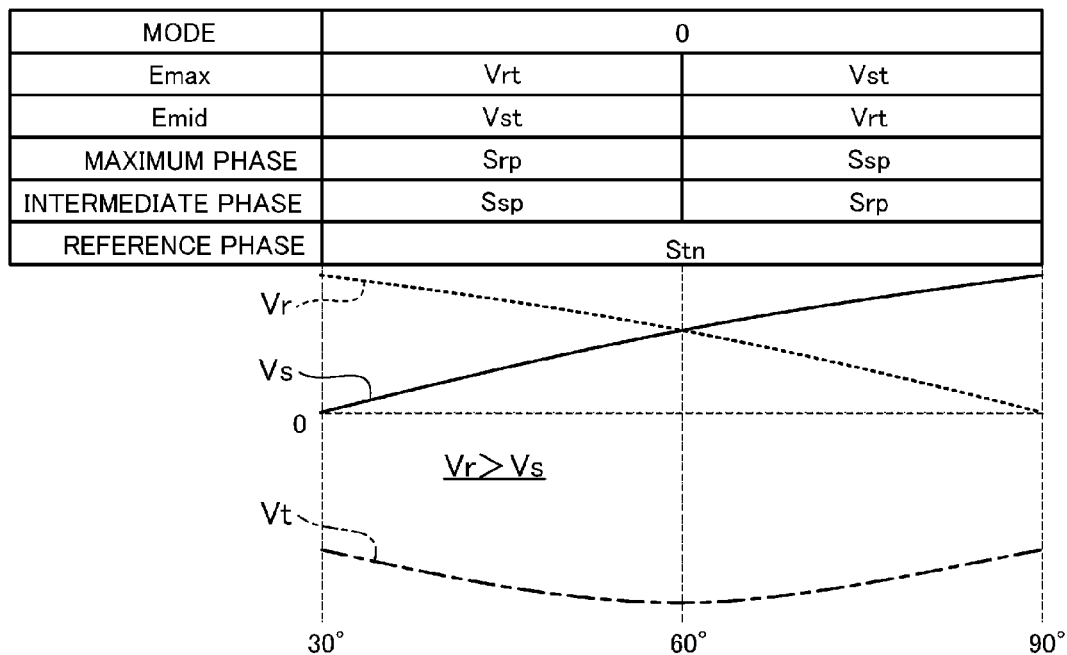
FIG. 13 shows a voltage waveform of each of the phases of an input three-phase alternating current in Mode 0.

The operation of the matrix converter in Mode 0 will be described as an example. FIG. 13 shows a voltage waveform of each of the phases of the input three-phase alternating current in Mode 0. In Mode 0, the phase t is the reference phase. The phase r is the maximum phase, and the phase s is the intermediate phase in the first half of the period. The phase s is the maximum phase, and the phase r is the intermediate phase in the second half of the period (see FIG. 11). For example, the period of the phase angle of 30°-90° (Sector 1) in FIG. 9 described above corresponds to Mode 0. As shown in FIG. 13, the intermediate phase and the maximum phase change at the phase angle of 60° in Mode 0.

Figure 14:
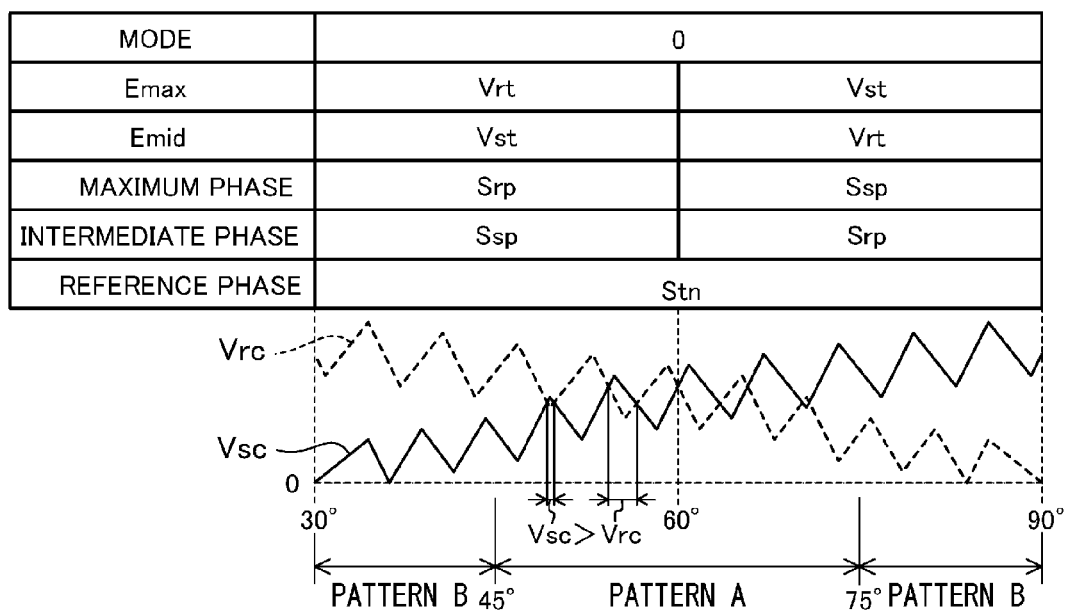
FIG. 14 shows the gate pattern switching state and the voltage waveforms of filter capacitors in Mode 0.
Figure 15:
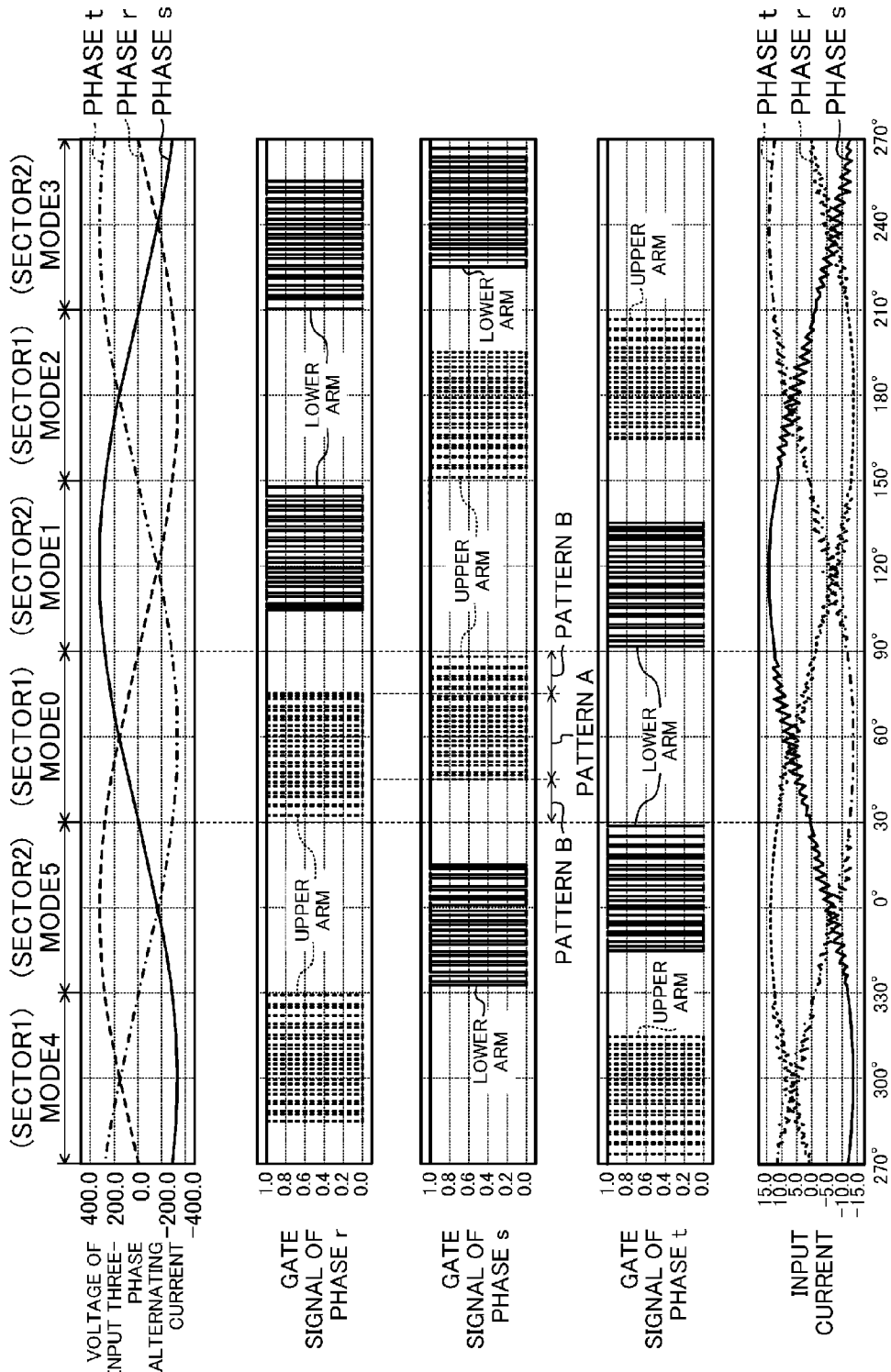
FIG. 15 shows waveforms of the gate signals of the respective phases, the voltages of the input three-phase alternating current, and the input currents having passed a filter capacitor according to the second embodiment.

FIG. 14 shows the gate pattern switching state and the voltage waveforms of the filter capacitors (C11, C12, C13) in Mode 0. As shown in FIG. 14, in Mode 0, the converter control unit (50a) (more specifically, the selector control unit (54)) of the present embodiment controls the gate signal to have the gate pattern A during the period of the phase angle of 45°-75°, and controls the gate signal to have the gate pattern B during the rest of the period (i.e., the period of the phase angle of 30°-45° and the period of the phase angle of 60°-90°). That is, the period of the phase angle of 45°-75° is the two-phase modulation period, and the period of the phase angle of 30°-45° and the period of the phase angle of 60°-90° are the one-phase modulation periods. Further, the converter control unit (50a) of the present embodiment performs the similar switching control in the other modes, as well. FIG. 15 shows the waveforms of the gate signal of the respective phases, the voltages of the input three-phase alternating current, and the input currents having passed the filter capacitor according to the present embodiment.

In a power converter having a current-source converter circuit such as the converter section (2), carrier ripples of the filter capacitor (C11, C12, C13) are superimposed as shown in FIG. 14. Further, there is a period in which the relationship of the magnitude of the voltages of the filter capacitors (C11, C12, C13) is reversed from the proper relationship of the magnitude of the voltages (hereinafter simply referred to as a "reverse period") near the phase angle at which the maximum phase and the intermediate phase change. In this example, the relationship between the magnitude of the voltage (Vrc) of the filter capacitor (C11) corresponding to the phase r and the magnitude of the voltage (Vsc) of the filter capacitor (C12) corresponding to the phase s is reversed at a plurality of points. These reverse periods of this example are included in the period of a 30-degree phase angle in the middle of which (i.e., at the phase angle of 60°) the intermediate phase and the maximum phase change. That is, the switching is performed by the gate pattern A in the reverse period.

Advantages of the Second Embodiment

The comparison between FIG. 15 (the present embodiment) and FIG. 9 (the first embodiment) shows that the distortion of the input three-phase alternating current is reduced in the present embodiment. This is because of the reason described below.

FIG. 16 schematically shows the waveforms of the phase currents when the switching is performed by the gate patterns A and B in the reverse period of Mode 0 (i.e., phase angle of 30°-60°). For example, if the switching is performed by the gate pattern A, the switching element (Srp) and the switching element (Ssp) are complementarily switched in Mode 0. The maximum phase is connected by turning the switching element (Ssp) on, and the intermediate phase is connected by turning the switching element (Ssp) off. Therefore, as shown in FIG. 16(A), the phase currents (Irp, Isp, Itn) flow complementarily in the switching element (Srp) and the switching element (Ssp).

On the other hand, if the switching is performed by the gate pattern B, the maximum phase is connected by turning the switching element (Ssp) on, and the intermediate phase is connected by turning the switching element (Ssp) off in the case where the relationship, the phase voltage Vr>the phase voltage Vs, is maintained (see FIG. 5(B)). Thus, similar to FIG. 16(A), the phase currents flow complementarily in the switching element (Srp) and the switching element (Ssp). However, in the case where the relationship of the magnitude of the maximum phase and the intermediate phase is inverted (see FIG. 14), the current which is supposed to flow in the switching element (Srp) flows in the switching element (Ssp) which is always on. Thus, no current flows in the switching element (Srp) as shown in FIG. 16(B).

Figure 17:
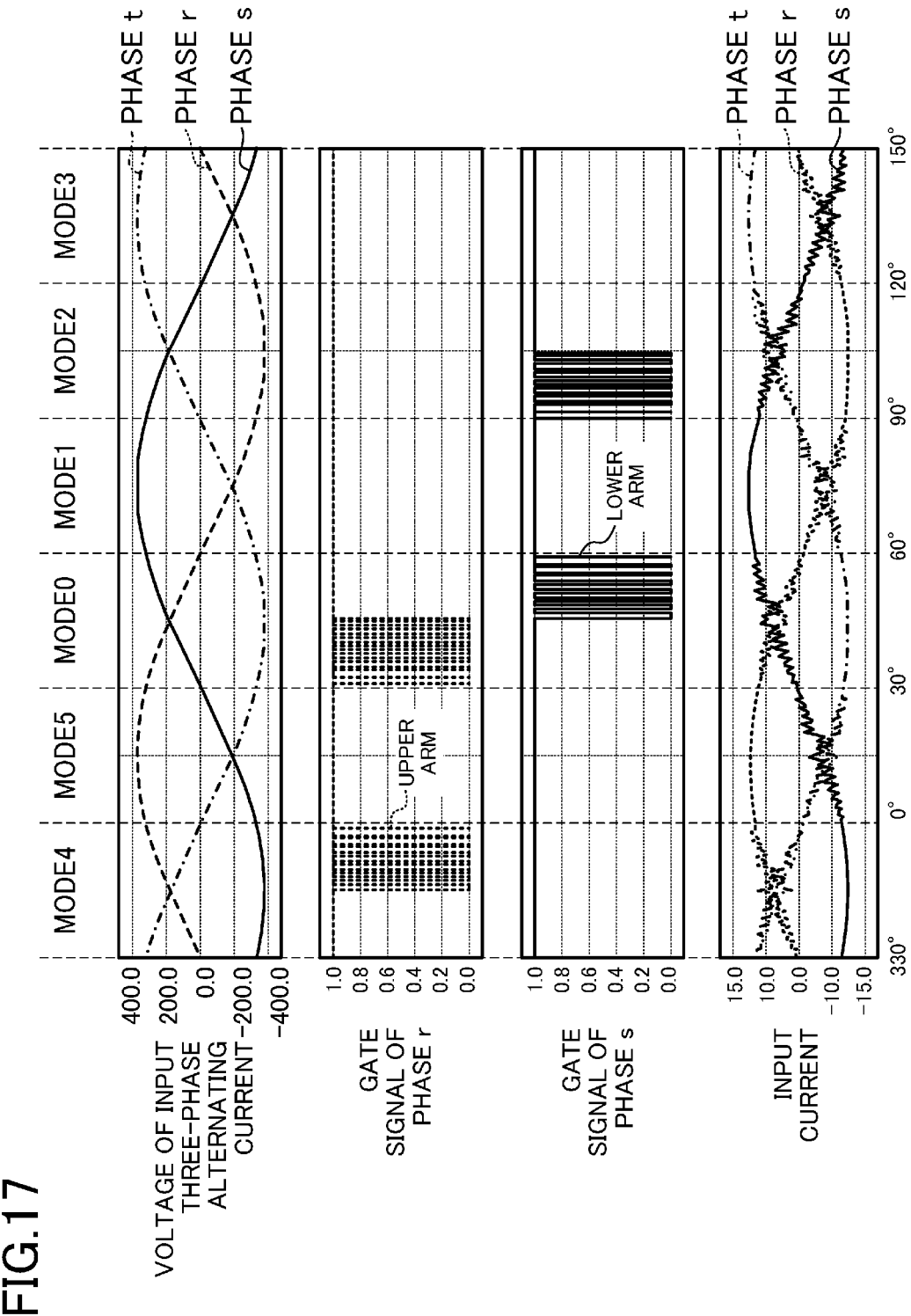
FIG. 17 shows the waveforms of the input three-phase alternating current, patterns of the gate signals of the phase r and the phase s (gate pattern B), and the input current having passed through a filter capacitor in the first embodiment and its variation.

The gate pattern in the first embodiment or its variation is always the gate pattern B. Thus, it may happen that no current flows as described above in the first embodiment or its variation. FIG. 17 shows the waveforms of the input three-phase alternating current, patterns of the gate signals of the phase r and the phase s (the gate pattern B), and the input current having passed through the filter capacitor (C11, C12, C13) in the first embodiment and its variation. As shown in the drawing, if the switching is performed only by the gate pattern B, the distortion of the input current having passed through the filter capacitor increases at every 60 degree angle where the maximum phase and the intermediate phase change.

On the other hand, in the present embodiment, the switching is performed by the gate pattern A (i.e., two phase modulation) during the period of a 30-degree phase angle which includes the reverse period, and in the middle of which period (or phase angle) the intermediate phase and the maximum phase change. Therefore, it is possible to reduce an increase of the distortion of the current waveform during this period. Further, similar to the matrix converters in the first embodiment and its variation, it is possible to reduce a leakage current of the switching element to which a reverse bias is applied, during the period in which the switching is performed by the gate pattern B (i.e., one-phase modulation). Accordingly, in the present embodiment, it is possible to obtain the effects of reducing a leakage current and the effects of reducing an increase of the distortion of the current waveform in a balanced manner.

In the present embodiment, the gate patterns A and B are switched every 30-degree phase angle. The value of 30 degrees is an integer submultiple of the sector. Thus, the switching between the gate patterns can be easily performed. Of course, the two-phase modulation period (the period of a 30-degree phase angle in the above example) is an example, and can be modified to a different value.

Third Embodiment of the Invention

Figure 18:
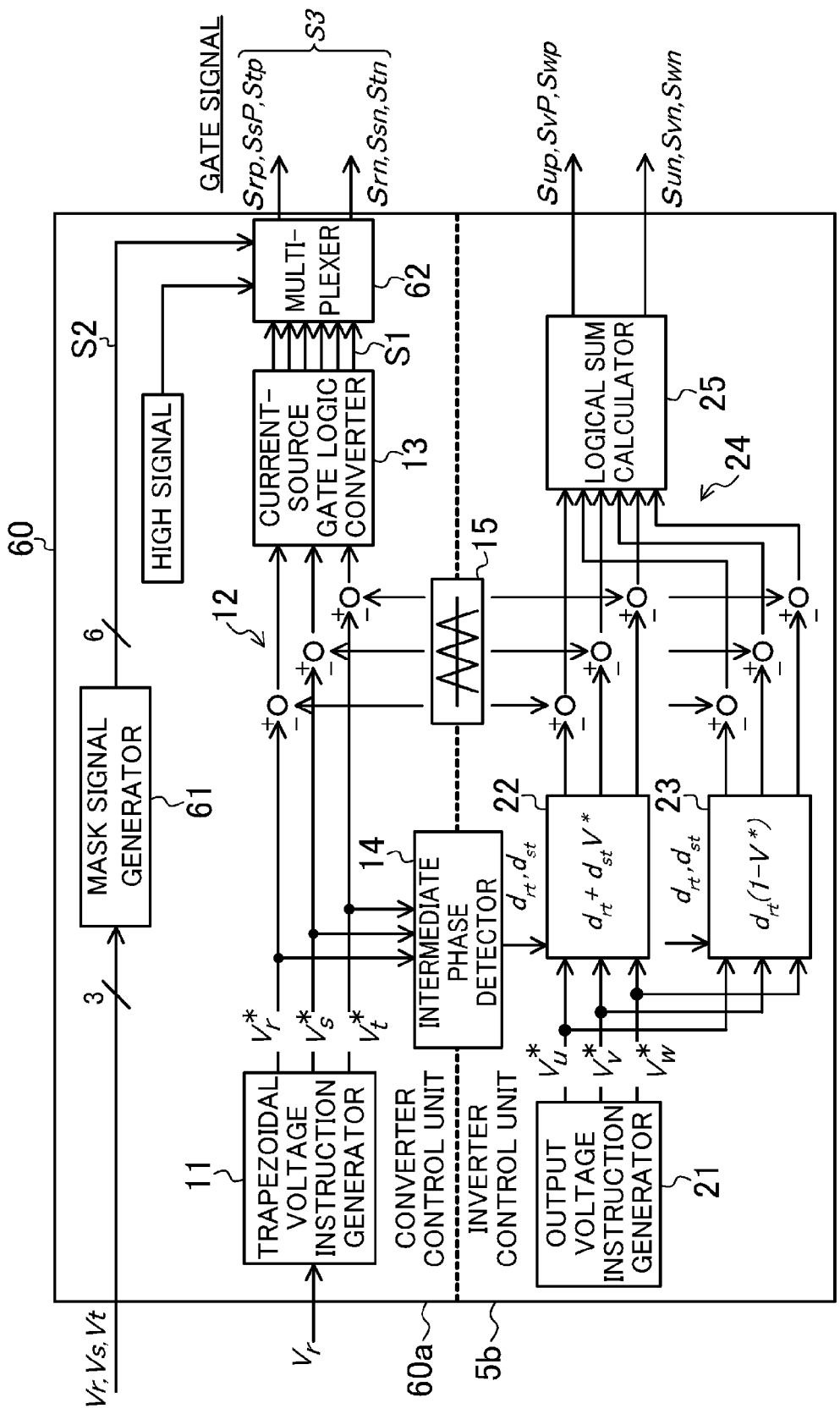
FIG. 18 shows a block diagram which illustrates a configuration of a control unit according to the third embodiment of the present invention.

FIG. 18 shows a block diagram which illustrates a configuration of a control unit (60) according to the third embodiment of the present invention. The control unit (60) includes a converter control unit (60a) and an inverter control unit (5b). That is, the control unit (60) is different from the first embodiment in the configuration of the converter control unit (60a). The converter control unit (60a) of the present embodiment includes a trapezoidal voltage instruction generator (11), a current-source gate logic converter (13), an intermediate phase detector (14), a carrier signal generator (15), a mask signal generator (61), and a multiplexer (62). The intermediate phase detector (14) and the carrier signal generator (15) are shared with the inverter control unit (5b).

The mask signal generator (61) outputs six mask signals (S2) which respectively correspond to the switching elements (Srp, . . . , Stn). The mask signals (S2) are at a high level (hereinafter referred to as "H level") with respect to the switching elements (Srp, . . . , Stn) corresponding to the phase to be modulated, and a low level (hereinafter referred to as "L level") with respect to the other switching elements (Srp, . . . , Stn). The matrix converter of the present embodiment performs the two-phase modulation. The mask signal generator (61) outputs an H level signal to the two switching elements (Srp, . . . , Stn) relating to modulation.

Figure 19:
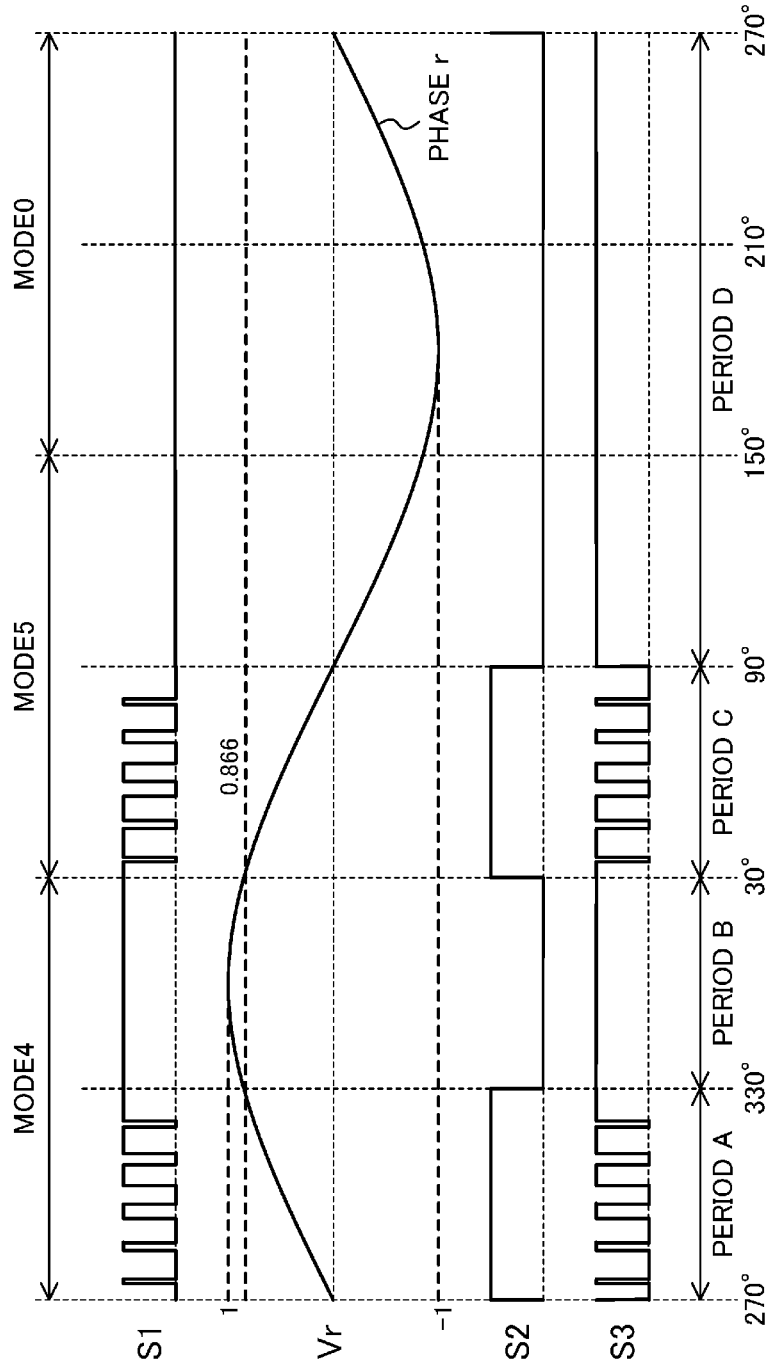
FIG. 19 shows the waveform of the voltage of the phase r, and the waveforms of the signals which correspond to the switching element (Srp) and which are output from a current-source gate logic converter, a mask signal generator, and a multiplexer, respectively.

FIG. 19 shows the waveform of the phase voltage Vr of the phase r (the voltage is normalized), and the waveforms of the signals (S1, S2, S3) which correspond to the switching element (Srp) and which are output from the current-source gate logic converter (13), the mask signal generator (61), and the multiplexer (62), respectively. FIG. 19 shows a period from Mode 4 to Mode 0. In this example, the mask signal (S2) corresponding to the switching element (Srp) is at H level in the period A (the first half of Mode 4) and the period C (the first half of Mode 5) shown in FIG. 19, and at L level in the period B (the second half of Mode 4) and the period D (from the second half of Mode 5 to the entire period of Mode 0).

In FIG. 19, S1 is a waveform of a signal output by the current-source gate logic converter (13). That is, S1 is a gate signal for conventional PWM control. The gate signal (S1) is at L level in the period D where the switching element (Srp) does not perform modulation. The gate signal (S1), the mask signal (S2), and a high-level signal (the High signal in FIG. 19) are input to the multiplexer (62).

The multiplexer (62) selects the gate signal (S1) if the mask signal (S2) is at H level, and selects the High signal if the mask signal (S2) is at L level, and outputs the selected signal to the switching elements (Srp, . . . , Stn). For example, the multiplexer (62) selects the gate signal (S1) for the switching element (Srp) that is output from the current-source gate logic converter (13), or the High signal, according to the mask signal (S2) as described above, and outputs the selected signal to the upper-arm switching element (Srp) corresponding to the phase r. The gate signal (S1), the mask signal (S2), and the gate signal (S3) relating to the phase r were described, but the same holds true for the signals relating to the phase s and the phase t.

Operation in the Third Embodiment

Figure 20:
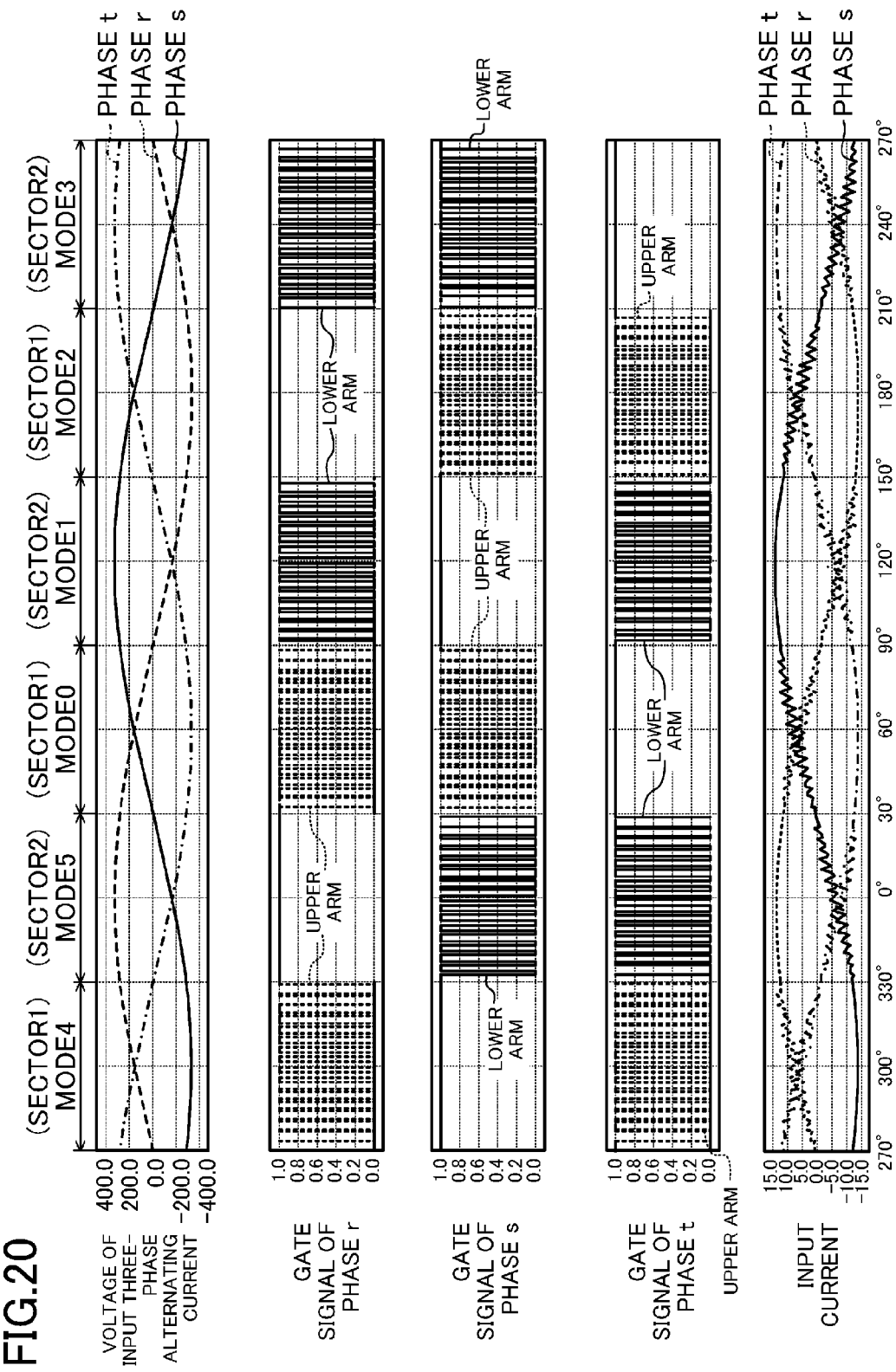
FIG. 20 shows the waveforms of gate signals of the respective phases, the voltages of an input three-phase alternating current, and input currents according to the third embodiment.

FIG. 20 shows the waveforms of the gate signals of the respective phases, the voltages of the input three-phase alternating current, and the input currents according to the third embodiment. According to the converter control unit (60a) of the present embodiment, in Mode 4 for example, the switching element (Srp) and the switching element (Stp) complementarily perform on/off operations at a predetermined duty cycle to modulate the phase r and the phase t. That is, two-phase modulation is performed in this matrix converter (1). Here, an H level signal is applied by the multiplexer (62) to each of the lower-arm switching element (Srn) corresponding to the phase r, the lower-arm switching element (Stn) corresponding to the phase t, and the two switching elements (Ssp, Ssn) corresponding to the phase s. In the other modes as well, an H level signal is applied to each of the switching elements (Srp, . . . , Stn) not performing the switching, while the two-phase modulation is performed.

Advantages of the Third Embodiment

In the present embodiment, the two-phase modulation is performed in the entire period of each mode as described above. Thus, it is possible to reduce the distortion of the input current more than in the other embodiments and variation. Moreover, since a predetermined gate voltage is applied to the switching element to which a reverse bias is applied, a leakage current can also be reduced.

Other Embodiments

The power converter may be configured without, for example, the inverter section (3), and the direct current voltage may be output by the converter section (2).

In addition to the reverse blocking IGBTs, transistors etc. having a bipolar structure may be utilized as the switching elements (Srp, . . . , Stn).

INDUSTRIAL APPLICABILITY

The present invention is useful as a power converter which converts alternating-current power to direct-current power or alternating-current power.

DESCRIPTION OF REFERENCE CHARACTERS 1 matrix converter (power converter)
2 converter section
3 inverter section
5 control unit 11 trapezoidal voltage instruction generator
30 control unit
50 control unit
60 control unit
L1 first direct current link (output line)
L2 second direct current link (output line)
Srp, . . . , Stn switching element

The invention claimed is:

1. A power converter, comprising:
a converter section which includes three pairs of switching elements, each pair having two switching elements connected in series between two output lines, and in which phases of an input three-phase alternating current are connected to nodes between the series-connected switching elements one by one; and
a control unit which controls on/off operations of the switching elements such that line voltages between a reference phase, which is one of the phases of the input three-phase alternating current, and each of the other phases are output to the two output lines on a time division basis, wherein
each of the switching elements is made of a transistor having a bipolar structure, and
in the on/off control, a reverse bias is selectively applied to one or more of the switching elements, and the control unit applies a non-zero predetermined gate voltage to each of the one or more of the switching elements while the reverse bias is applied thereto.

2. The power converter of claim 1, wherein
a phase whose voltage has a largest absolute value is selected as the reference phase in each of a sector in which two phase voltages of the input three-phase alternating current are positive and one phase voltage is negative, and a sector in which two phase voltages are negative and one phase voltage is positive, and
provided that one of the phases other than the reference phase whose voltage has an absolute value larger than a voltage of the other phase is a maximum phase, the control unit controls, at a predetermined duty cycle, the on/off operation of one of the switching elements corresponding to at least the maximum phase to which a forward bias is applied.

3. The power converter of claim 2, wherein
the control unit controls the on/off operations of only the switching elements corresponding to the maximum phase.

4. The power converter of claim 2, wherein
provided that the phase other than the reference phase and the maximum phase is an intermediate phase,
the on/off operations of the switching element to which the forward bias is applied, and one of the switching elements corresponding to the intermediate phase from which a current flows, are complementarily controlled at a predetermined duty cycle during part of a period of each sector, and the on/off operation of only the switching element to which the forward bias is applied is controlled at a predetermined duty cycle during the rest of the period of the sector.

5. The power converter of claim 4, wherein
a filter capacitor is provided for each of the phases of the input three-phase alternating current, and
the part of the period includes a period in which a voltage of the filter capacitor corresponding to the intermediate phase is larger than a voltage of the filter capacitor corresponding to the maximum phase.

6. The power converter of claim 4, wherein
the part of the period is a period corresponding to a 30 degree phase angle of the input three-phase alternating current.

7. The power converter of claim 2, wherein
provided that the phase other than the reference phase and the maximum phase is an intermediate phase,
the control unit complementarily controls, at a predetermined duty cycle, the on/off operations of the switching element to which the forward bias is applied, and one of the switching elements corresponding to the intermediate phase from which a current flows.

8. The power converter of claim 1, wherein
the control unit includes a trapezoidal voltage instruction generator which obtains an inclination region of a voltage instruction signal having a trapezoidal waveform and corresponding to each of the phases of the input three-phase alternating current, based on a power source synchronization signal synchronized to the input three-phase alternating current, and
the control unit generates gate signals for the respective switching elements using the voltage instruction signal of any one of the phases.

9. The power converter of claim 1, further comprising:
an inverter section which converts power output to the output line to a predetermined single-phase alternating current or a polyphase alternating current.

10. A method for controlling a power converter having a converter section which includes three pairs of switching elements, each pair having two switching elements connected in series between two output lines, and in which phases of an input three-phase alternating current are connected to nodes between the series-connected switching elements one by one, the method comprising:
selecting one of the phases of the input three-phase alternating current as a reference phase;
controlling on/off operations of the switching elements such that line voltages between the reference phase and each of the other phases are output to the two output lines on a time division basis;
determining one or more of the switching elements to which a reverse bias is applied in the on/off control; and
applying, in the on/off control, a non-zero predetermined gate voltage to each of the one or more of the switching elements determined in the determining of the switching element while the reverse bias is applied thereto.

11. The power converter of claim 1, wherein the predetermined gate voltage is a voltage at which a current can flow between a collector and an emitter of the switching element to which the predetermined gate voltage is applied.

12. The method of claim 10, wherein the predetermined gate voltage is a voltage at which a current can flow between a collector and an emitter of the switching element to which the predetermined gate voltage is applied.

* * * * *